US008180786B2

(12) United States Patent
Veanes et al.

(10) Patent No.: US 8,180,786 B2
(45) Date of Patent: May 15, 2012

(54) SYMBOLIC QUERY EXPLORATION

(75) Inventors: Margus Veanes, Bellevue, WA (US);
Nikolai Tillmann, Redmond, WA (US);
Jonathan Paul de Halleux, Seattle, WA (US); Pavel Grigorenko, Tallinn (EE)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 12/549,380

(22) Filed: Aug. 28, 2009

(65) Prior Publication Data

US 2011/0055237 A1 Mar. 3, 2011

(51) Int. Cl.
*G06F 17/30* (2006.01)
(52) U.S. Cl. ........... 707/759; 707/758; 717/104; 714/38
(58) Field of Classification Search ........... 707/999.102, 707/758–759; 717/104; 714/38, 38.1; 715/209
See application file for complete search history.

(56) References Cited

U.S. PATENT DOCUMENTS

| | | | | |
|---|---|---|---|---|
| 5,768,158 | A * | 6/1998 | Adler et al. | 715/209 |
| 7,171,428 | B1 * | 1/2007 | Saghbini et al. | 707/999.102 |
| 7,953,744 | B2 * | 5/2011 | Gharat et al. | 707/758 |
| 2006/0242466 | A1 | 10/2006 | Tillmann et al. | |
| 2007/0033440 | A1 | 2/2007 | Tillmann et al. | |
| 2007/0033443 | A1 | 2/2007 | Tillmann et al. | |
| 2007/0074152 | A1 * | 3/2007 | Roe | 717/104 |
| 2007/0226665 | A1 | 9/2007 | Ganai et al. | |
| 2008/0270841 | A1 * | 10/2008 | Quilter | 714/38 |
| 2008/0307264 | A1 | 12/2008 | De Halleux et al. | |

OTHER PUBLICATIONS

Cimatti et al., "Beyond Boolean SAT: Satisfiability Modulo Theories", May 28-30, 2008, Proceedings of the 9th International Worklshop on Discrete Event Systems, Swedan, 68-73.*
Halleux, et al., "Parameterized Unit Testing with Microsoft Pex," retrieved at <<http://research.microsoft.com/en-us/projects/pex/pextutorial.pdf>>, tutorial provided by Microsoft Corporation, Redmond, WA, Apr. 8, 2009, pp. 1-78.
Sebastini, Roberto, "Lazy Satisfiability Modulo Theories," retrieved at <<http://jsat.ewi.tudelft.nl/content/volume3/JSAT3_9_Sebastiani.pdf>>, Journal on Satisfiability, Boolean Modeling and Computation, vol. 3, Dec. 2007, pp. 141-224.
Khurshid, et al., "Generalized Symbolic Execution for Model Checking and Testing," retrieved at <<http://sdg.csail.mit.edu/pubs/2003/GSE.pdf>>, Tools and Algorithms for the Construction and Analysis of Systems, vol. 2619, Springer Verlag, 2003, 16 pages.

(Continued)

*Primary Examiner* — Sathyanarayan Pannala

(57) ABSTRACT

A symbolic query exploration (QEX) module automatically produces output information that can be used to evaluate a database. The QEX module operates by converting an input query into a formula for processing by a satisfiability module theories (SMT) solver module. The SMT solver module generates a model that satisfies the formula. The model yields table information that is used to populate the database and, optionally, parameter information that is used to instantiate the query. A query evaluation module then submits the instantiated query to the populated database and evaluates whether an evaluation result produced thereby agrees with pre-specified condition information. The QEX module can preprocess the formula using either (or both) an eager expansion approach (in which the formula is expanded in an upfront manner) or a lazy expansion approach (in which axioms are identified for later possible expansion by the SMT solver module).

20 Claims, 10 Drawing Sheets

OTHER PUBLICATIONS

"Automation of Unit Testing," retrieved at <<http://www.cs.utep.edu/cheon/ssvl/utjml/utest.html>>, the UTJML Project lead by Yoonsik Cheon, Oct. 7, 2008, 3 pages.

Lerman, Julie, "A Look at Lazy Loading in EF4," retrieved at <<http://www.thedatafarm.com/blog/CategoryView,category,Data%2BAccess.aspx>>, Julie Lerman Blog—Data Access, May 22, 2009, 191 pages.

Vanoverberghe, et al., "Test Input Generation for Programs with Pointers," retrieved at <<http://www.springerlink.com/content/237r22k478256435/>>, Lecture Notes in Computer Science, vol. 5505, Proceedings of the 15th International Conference on Tools and Algorithms for the Construction and Analysis of Systems: Held as Part of the Joint European Conferences on Theory and Practice of Software, ETAPS 2009, Mar. 1, 2009, pp. 277-291.

"Select (T-SQL)," retrieved at <<http://msdn.microsoft.com/en-us/library/ms189499.aspx>>, SQL Server 2008 Books Online, msdn.com, Microsoft Corporation, Redmond, WA, Apr. 2009, 3 pages.

Binnig et al., "QAGen: Generating Query-Aware Test Databases," retrieved at <<http://i.cs.hku.hk/~ecllo/research/sigmod07.pdf>>, Proceedings of the 2007 ACM SIGMOD International Conference on Management of Data, 2007, 12 pages.

Bjorner, et al., "Symbolic Bounded Model Checking of Abstract State Machines," retrieved at <<http://research.microsoft.com/en-us/um/people/gurevich/opera/199.pdf>>, Technical Report MSR-TR-2009-14, Microsoft Research, Feb. 2009, 34 pages.

Bjorner, et al., "Path Feasibility Analysis for String-Manipulating Programs," retrieved at <<http://research.microsoft.com/pubs/70656/tr-2008-153.pdf>>, Lecture Notes in Computer Science, vol. 5505, Proceedings of the 15th International Conference on Tools and Algorithms for the Construction and Analysis of Systems, Springer-Verlag, 2009, 16 pages.

Chakravarthy et al., "Logic-based Approach to Semantic Query Optimization," retrieved at <<acm.org>>, ACM Transactions on Database Systems (TODS), vol. 15, Issue 2, Jun. 1990, pp. 162-207.

Chays, et al., "Query-based Test Generation for Database Applications", retrieved at <<acm.org>>, International Conference on Management of Data, Proceedings of the 1st international Workshop on Testing Database Systems, Vancouver, British Columbia, Canada, DBTest'08, Jun. 13, 2008, 6 pages.

Chinaei, Hamid R., "An Ordered Bag Semantics for SQL," retrieved at <<http://uwspace.uwaterloo.ca/bitstream/10012/3062/1/Thesis.pdf>>, masters thesis, University of Waterloo, Ontario, Canada, 2007, 52 pages.

Cook, et al., "Cogent: Accurate Theorem Proving for Program Verification", retrieved at <<http://research.microsoft.com/en-us/um/cambridge/projects/terminator/cogent.pdf>>, Proceedings of CAV 2005, vol. 3576, Lecture Notes in Computer Science, Springer-Verlag, 2005, 4 pages.

Danstin, et al., "Complexity of Query Answering in Logic Databases with Complex Values," retrieved at <<http://citeseerx.ist.psu.edu/viewdoc/download?doi=10.1.1.49.4587&rep=rep1&type=pdf>>, Lecture Notes in Computer Science, vol. 1234, Proceedings of the 4th International Symposium on Logical Foundations of Computer Science, pp. 56-66, 1997, 12 pages.

"Z3: An Efficient SMT Solver," retrieved at <<http://research.microsoft.com/en-us/um/redmond/projects/z3/>>, Z3 project home page, Microsoft Corporation, Redmond, WA, Sep. 2008, 1 page.

Deng, et al., "Testing Database Transactions with AGENDA," retrieved at <<acm.org>>, International Conference on Software Engineering, Proceedings of the 27th International Conference on Software Engineering, 2005, pp. 78-87.

Emmi, et al., "Dynamic Test Input Generation for Database Applications," retrieved at <<acm.org>>, Proceedings of the ACM/SIGSOFT International Symposium on Software Testing and Analysis, 2007, pp. 151-161.

Jackson, Daniel, "Automating First-Order Relational Logic," retrieved at <<http://sdg.csail.mit.edu/pubs/2000/alcoa-algorithm.pdf>>, Foundations of Software Engineering, Proceedings of the 8th ACM SIGSOFT International Symposium on Foundations of Software Engineering: Twenty-First Century Applications, 2000, 11 pages.

Khalek, et al., "Query-aware Test Generation Using a Relational Constraint Solver," retrieved at <<http://users.ece.utexas.edu/~elkarabl/files/adusa.pdf>>, 23rd IEEE/ACM International Conference on Automated Software Engineering, 2008, 10 pages.

Negri, et al., "Formal Semantics of SQL Queries," retrieved at <<acm.org>>, ACM Transactions on Database Systems (TODS), vol. 16, Issue 3, Sep. 1991, pp. 513-534.

"Pex—Automated White Box Testing for .NET," retrieved at << http://research.microsoft.com/projects/pex>>, PEX project home page, Microsoft Corporation, Redmond, WA, retrieved on May 22, 2009, 1 page.

Ranise, et al., "The SMT-LIB Standard: Version 1.2," retrieved at <<http://combination.cs.uiowa.edu/smtlib/papers/ format-v1.2406.08.30.pdf>>, Aug. 2006, 43 pages.

Sheard, et al., "Automatic Verification of Database Transaction Safety," retrieved at <<acm.org>>, ACM Transactions on Database Systems (TODS), vol. 14, Issue 3, Sep. 1989, pp. 322-368.

Tillmann, et al., "Pex—White Box Test Generation for .NET," retrieved at <<http://www.springerlink.com/content/5q367v5652277x47/fulltext.pdf>>, Lecture Notes in Computer Science, vol. 4966, Tests and Proofs 2008, 2008, Springer-Verlag, pp. 134-153.

Tsai, et al., "Automated Test Case Generation for Programs Specified by Relational Algebra Queries," retrieved at <<http://ieeexplore.ieee.org/stamp/stamp.jsp?tp=&arnumber=48939>>, IEEE Transactions on Software Engineering, vol. 16, Issue 3, Mar. 1990, pp. 316-324.

Veanes, et al., "Symbolic Bounded Conformance Checking of Model Programs," retrieved at <<http://research.microsoft.com/pubs/79937/bref.pdf>>, Technical Report MSR-TR-2009-28, Microsoft Research, Mar. 2009, 15 pages.

Moura, et al., "Z3: An Efficient SMT Solver," retrieved at <<http://research.microsoft.com/en-us/um/redmond/projects/z3/z3.pdf>>, Lecture Notes in Computer Science, vol. 4963, Tools and Algorithms for the Construction and Analysis of Systems, TACAS 2008, Springer-Verlag, Apr. 2008, 4 pages.

Boyer, et al., A Computational Logic Handbook, retrieved at <<www.amazon.com>>, book description, 2nd Edition, Academic Press, Oct. 1997, retrieved on Aug. 27, 2009, 4 pages.

Jackson, Daniel, Software Abstractions: Logic, Language, and Analysis, retrieved at <<www.amazon.com>>, book description, MIT Press, Apr. 2006, retrieved on Aug. 27, 2008, 7 pages.

"Pex—Documentation," retrieved at <<http://research.microsoft.com/en-us/projects/pex/documentation.aspx>>, PEX project documentation home page, Microsoft Corporation, Redmond, WA, retrieved on Aug. 27, 2009, 1 page.

"Z3: An Efficient SMT Solver: Documentation," retrieved at <<http://research.microsoft.com/en-us/um/redmond/projects/z3/documentation.html>>, Z3 project documentation home page, Microsoft Corporation, Redmond, WA, retrieved on Aug. 27, 2009, 3 pages.

"Qex—Symbolic SQL Query Exploration," retrieved at <<http://research.microsoft.com/en-us/projects/qex/>>, QEX project homepage, Microsoft Corporation, Redmond, WA, retrieved on Aug. 27, 2009, 1 page.

Veanes, et al.; "Symbolic Query Exploration"; ICFEM'09, Ser. LNCS; vol. 5885; May 2009; Springer; pp. 49-68.

* cited by examiner q1: SELECT C.CustomerID,O.OrderID
FROM Orders AS 0
JOIN Customers AS C ON CustomersID = C.CustomerID
WHERE 0.CustomerID > 2 AND 0.OrderID < 15 q2: SELECT C.CustomerID, Count(O.OrderID)
FROM Orders AS O
JOIN Customes AS C ON O.CustomersID = C.CustomerID
GROUP BY C.CustomerID HAVING Count(O.OrderID) > 1 q3: DECLARE @value AS INT;
SELECT C.CustomerID, SUM(OP.OrderProductQuantity * P.ProductPrice)
FROM OrderProducts AS OP
JOIN Orders AS O ON OP.OrderID = O.OrderID
JOIN Products AS P ON OP.ProductID = P.ProductID
JOIN Customers AS C ON O.CustomerID = C.CustomerID
WHERE @value >1
GROUP BY C.CustomerID
HAVING SUM(OP.OrderProductQuantity * P.ProductPrice) > 100 + @value

FIG. 8

Exploration Results

1/1 Exploration: SelectGoodCustomersTest.SelectGoodCustomers()

| | Customers | OrderedProd | Orders | Products | @value | Result |
|---|---|---|---|---|---|---|
| ✓ 1 | {{20,1}} | {{1,1,6}} | {{1,20}} | {{1,1,18}} | 7 | {{20, 108}} |

Detail

Insert Into Products    → Go To   904

```
(benchmark sum_test
:logic Ints
:extrasorts (Z3Set)
:extrafuns ((EmptyZ3Set Z3Set) (Store Int Z3Set Z3Set))
:extrapreds ((NotIn Int Z3Set))
:extrasorts (SetDescriber)
:extrafuns ((Empty SetDescriber) (Set bool Int SetDescriber SetDescriber))
:extrafuns ((Sum SetDescriber Z3Set Int))

;definition of NotIn
:assumption  (forall (i Int)
                (iff (NotIn i EmptyZ3Set) true)
                :pat{(NotIn i EmptyZ3Set)}
                )
:assumption (forall (i Int) (s Z3Set)
                (iff (NotIn i (Store i s)) false)
                :pat{(NotIn i (Store i s))}
                )
:assumption (forall (i Int) (j Int) (s Z3Set)
                (implies (not (= i j))
                        (iff (NotIn i (Store j s))
                            (NotIn i s)))
                :pat{(NotIn i (Store j s))}
                )
;definition of Sum
:assumption (forall (s Z3Set)
        (= (Sum Empty s) 0)
        :pat{(Sum Empty s)}
        )
:assumption (forall (r SetDescriber) (b bool) (u Int) (s Z3Set)
        (= (Sum (Set b u r) s) (+ (ite (and b (NotIn u s)) u 0) (Sum r (Store u s))))
        :pat{(Sum (Set b u r) s)}
        )
:extrafuns ((x Int) (y Int) (z Int) (res Int))
:extrafuns ((b bool))
:assumption (and (> x 0) (> y 0) (> z 0) (> res 10))

;the actual formula being checked
:formula (= res (Sum (Set (< x y) 3 (Set b 5 (Set (< y z) 4
(Set (< z x) 4 (Set b 5 Empty))))) EmptyZ3Set))

```
(benchmark join_test
:logic Ints
:extrasorts (Tuple1)
:extrafuns ((T1 Int Tuple1))
:extrafuns ((Elem1 Tuple1 Int))
:assumption (forall (i Int)
      (= (Elem1 (T1 i)) i)
      :pat{(Elem1 (T1 i))}
      )
:extrasorts (Tuple2)
:extrafuns ((T2 Int Int Tuple2))
:extrasorts (List1)
:extrafuns ((Nil1 List1) (Cons1 Tuple1 List1 List1))
:extrasorts (List2)
:extrafuns ((Nil2 List2) (Cons2 Tuple2 List2 List2))
:extrafuns ((Join List1 List1 List2))
:extrafuns ((Join1 Tuple1 List1 List1 List1 List2))
;definition of Join
:assumption (forall (x List1)
      (= (Join x Nil1) Nil2)
      :pat{(Join x Nil1)}
      )
:assumption (forall (t Tuple1) (x List1) (y List1)
      (implies (not (= y Nil1))
            (= (Join (Cons1 t x) y)
               (Join1 t x y y)))
      :pat{(Join (Cons1 t x) y)}
      )
;definition of helper function Join1
:assumption (forall (t Tuple1) (x List1) (y List1)
      (= (Join1 t x Nil1 y)
         (Join x y))
      :pat{(Join1 t x Nil1 y)}
      )
:assumption (forall (t Tuple1) (u Tuple1) (x List1) (y List1) (z List1)
      (= (Join1 t x (Cons1 u y) z)
         (Cons2 (T2 (Elem1 t) (Elem1 u))
               (Join1 t x y z)))
      :pat{(Join1 t x (Cons1 u y) z)}
      )
:extrafuns ((l List2))
:extrafuns ((l1 List1) (l2 List1))
:formula (and (= l1 (Cons1 (T1 1) (Cons1 (T1 2) (Cons1 (T1 3) Nil1))))
       (= l2 (Cons1 (T1 5) (Cons1 (T1 6) Nil1)))
       (= l (Join l1 l2)))
)
```

FIG. 12

SYMBOLIC QUERY EXPLORATION

BACKGROUND

An individual may wish to evaluate a database for various reasons. For example, the individual may wish to perform a unit test on the database to ensure that it returns correct results when queried. Alternatively, or in addition, the individual may wish to perform various integrity or security checks on the database.

In a typical approach, the individual may conduct the evaluation in a manual ad hoc manner, sometimes relying on randomization techniques. For example, the individual may manually generate test data for use in evaluating a database for a particular test query. That test data may include one or more test tables to be loaded into the database, as well as one or more parameter values for use in the test query. The individual may then manually submit the test query (which includes the selected parameter value(s)) to the database (which includes the selected test table(s)). The individual may then determine whether the query produces a result which agrees with an expected test condition. This approach can be both tedious and prone to errors. For instance, there are often multiple constraints which have a bearing on the creation of test data, presenting a sometimes-complex combinatorial problem. In view thereof, the individual may find it burdensome to produce the test data in a reliable manner.

SUMMARY

A symbolic query exploration (QEX) module is described herein for evaluating a database in a substantially automated manner using a satisfiability modulo theories (SMT) solver module. By virtue of this approach, the QEX module can facilitate and expedite the evaluation of the database. This approach also reduces the opportunity for error in the course of the evaluation. The QEX module can be employed to provide unit testing for the database, integrity checking, security-related checking, and so on.

According to one illustrative implementation, the QEX module operates by receiving input information, which includes: query information that describes a query (such as a Structured Query Language query) to be presented to the database; condition information that describes a desired condition to be met upon submitting the query to the database; and database information which describes at least one characteristic of the database (such as a characteristic defined by a schema of the database). Based on this input information, the QEX module generates a formula which expresses the query within a background theory that is sufficiently rich to capture the semantics of the query. The QEX module then submits the formula to the SMT solver module for processing.

The SMT solver module finds a model which represents a solution to the formula (if the formula is satisfiable). The QEX module can then use domain-specific mapping functions to convert the model into output information which includes: table information that provide one or more tables for populating the database; parameter information that provides one more parameters to instantiate the query (if the query includes one or more parameter variables); and result information that provides a predicted result that is expected to occur upon submission of the query to the database.

A query evaluation module then proceeds by populating the database with the table information. The query evaluation module also instantiates the query with the parameter information. The query evaluation module then submits the instantiated query to the populated database and receives an evaluation result. The query evaluation module compares the evaluation result with the condition information (and/or the predicted results) to provide an evaluation assessment.

According to another illustrative aspect, the QEX employs a preprocessing module to preprocess the formula before submitting it to the SMT solver module. In one case, the preprocessing uses an eager expansion approach to expand the formula before submitting the formula to the SMT solver module. In another case, the preprocessing uses a lazy expansion approach to provide axioms to the SMT solver module along with the formula. The axioms allow the SMT solver module to expand the formula on an as-needed basis during its search for a solution.

According to another illustrative feature, the QEX module can employ the Z3 SMT solver as the SMT solver module, provided by Microsoft Corporation of Redmond, Wash.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 shows three illustrative queries that can be used to evaluate the database of FIG. 7.

FIG. 9 shows an illustrative user interface presentation that conveys output information generated by the QEX module, e.g., in processing a third query shown in FIG. 8.

FIGS. 11 and 12 show two examples which illustrate the encoding of expansion rules as axioms for a SMT solver module employed by the QEX module.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a symbolic query exploration (QEX) module for automating the evaluation of a database using a satisfiability modulo theories (SMT) solver module. The disclosure is organized as follows. Section A describes an overview of a system for evaluating the database using the QEX module. Section B provides a more formal description of the operation of the QEX module, describing the manner in which the QEX module transforms a query into a formula for processing by the SMT solver module, and then how the SMT solver module operates on the formula. In other words, Section B explains the illustrative mathematical underpinnings of the functionality set forth in Section A. Section C describes illustrative processing functionality that can be used to implement any aspect of the features described in the aforementioned sections.

Figure 10:
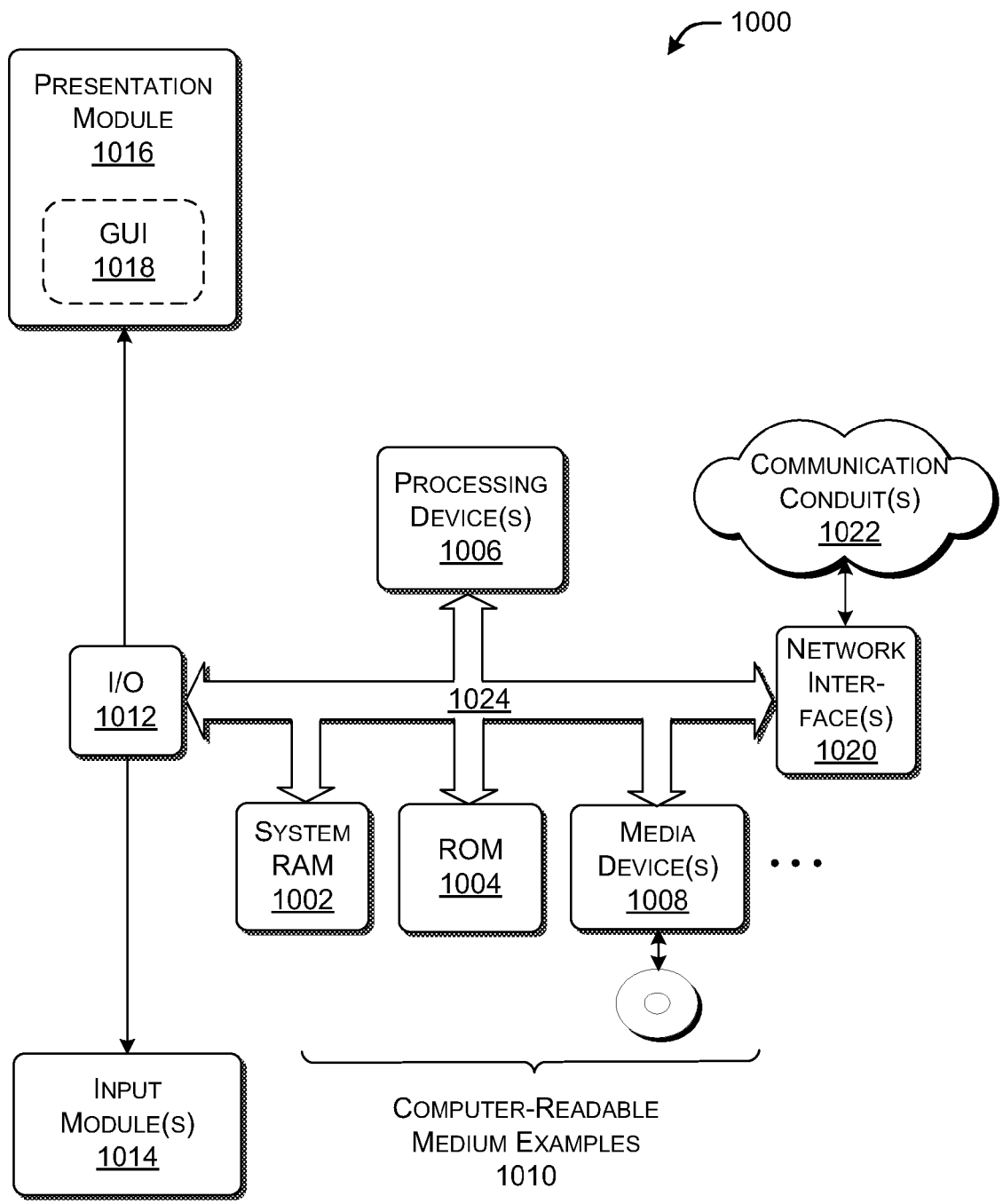
FIG. 10 shows illustrative processing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component. FIG. 10, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

As to terminology, the phrase "configured to" encompasses any way that any kind of functionality can be constructed to perform an identified operation. The term "logic" or "logic component" encompasses any functionality for performing a task. For instance, each operation illustrated in the flowcharts also corresponds to a logic component for performing that operation. When implemented by a computing system, a logic component represents an electrical component that is a physical part of the computing system, however implemented.

A. Overview

Figure 1:
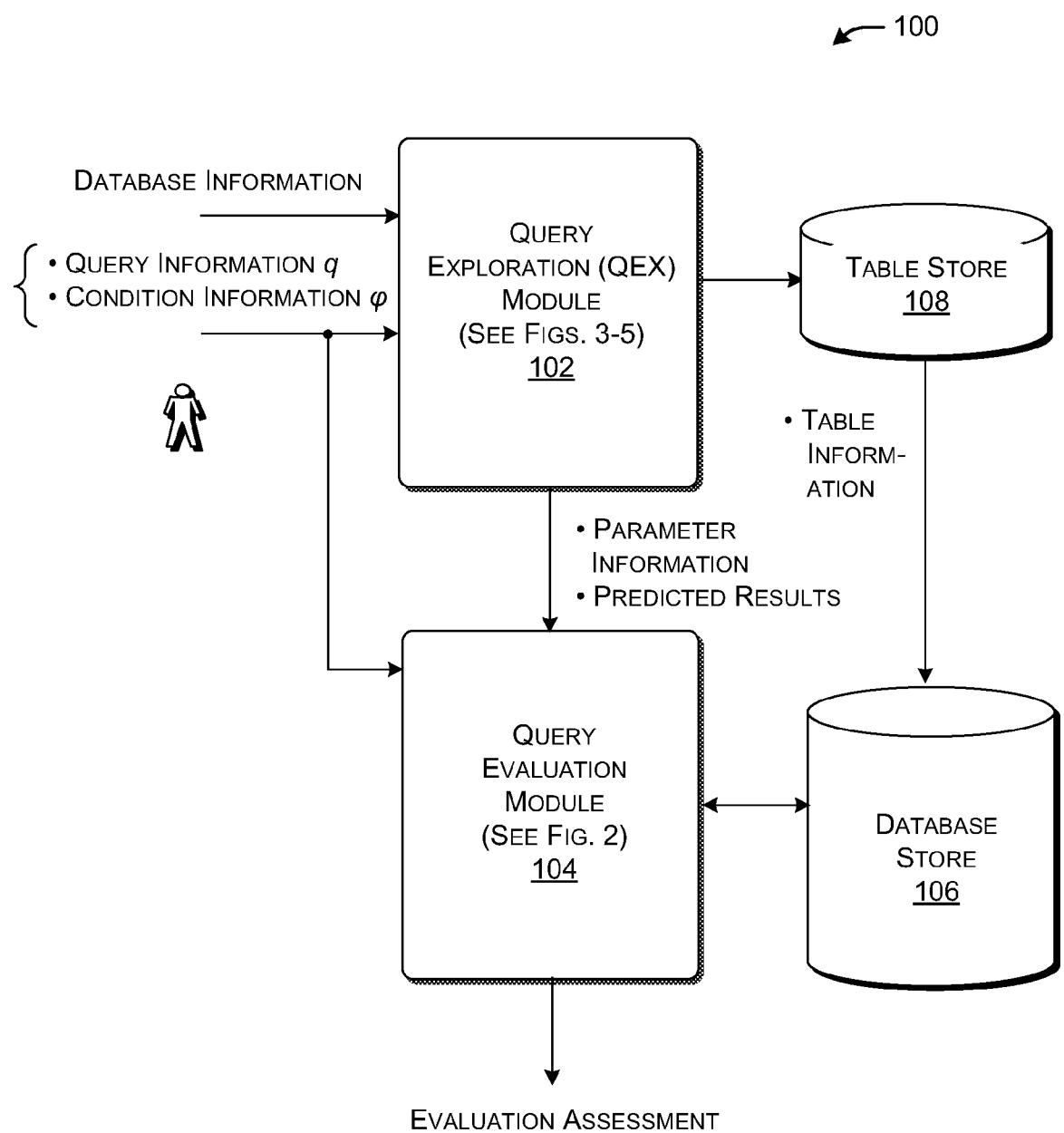
FIG. 1 shows a system which employs a symbolic exploration (QEX) module in cooperation with a query evaluation module to evaluate a database.

FIG. 1 shows a system 100 which employs a symbolic query exploration (QEX) module 102 in cooperation with a query evaluation module 104 to evaluate a database. The database is provided in database store 106. As summarized above, the system 100 allows an individual to automate (or at least partially automate) the evaluation of the database using a satisfiability modulo theories (SMT) approach. By virtue of this approach, the system 100 expedites the evaluation of the database and reduces the opportunity for error in the course of the evaluation.

By way of broad overview, the system 100 uses the QEX module 102 to convert a query into a logical form that can be processed by an SMT solver module. The SMT solver module automatically (or semi-automatically) determines test data for use in performing the evaluation. In generating the test data, the SMT solver module solves an oftentimes-complex combinatorial problem defined by multiple constraints. The evaluation module 104 carries out the evaluation of the database based on the test data. Hence, in entirety, the system 100 automatically "sets up" an evaluation and then conducts that evaluation, freeing the user from the painstaking task of generating and applying test data in a manual fashion.

To perform these functions, the QEX module 102 receives a variety of input information from different sources. For example, the input information includes database information which describes characteristics of the database to be evaluated. For example, the database information may capture information obtained from the schema of the database. The schema, in turn, may describe the structure of the database as well as the type of information provided in the database. In one case, for instance, the database information may indicate that certain elements in a table correspond to integer values, other elements correspond to Boolean values, other elements correspond to keys, etc. The schema can also specify that certain range restrictions apply to certain elements, and so forth. The input information also includes query information regarding a query to be presented to the database. For example, without limitation, the query information may describe a Structured Query Language (SQL) query. SQL corresponds to a well-known language for interacting with relational databases. The input information also includes condition information that describes a desired condition to be met upon submitting the query to the database. Examples of standard test criteria are: the answer to the query is empty; the answer is non-empty; the answer contains a given number of distinct rows; the answer provides a specified result, and so on. In effect, the condition information specifies the coverage of the evaluation, while the query information functions as an evaluation scenario.

The QEX module 102 generates output information based on the input information using an SMT approach. The output information includes table information (for storage in a table store 108) that provides one or more tables for populating the database. The output information also includes parameter information that provides one more parameter values to instantiate the query, if the query includes one or more parameter variables. The table information and the parameter information constitute the abovementioned test data. The output information also includes result information that provides a predicted result that is expected to occur upon submission of the query to the databases.

The query evaluation module 104 operates by populating the database in the database store 106 with the table information provided in the table store 108. Further, the query evaluation module 104 instantiates the query with the parameter information. The query evaluation module 104 then submits the instantiated query to the populated database and receives an evaluation result. The query evaluation module 104 module compares the evaluation result with the condition information (and/or the predicted results) to provide an evaluation assessment. For example, suppose that the condition information specifies that the query is expected to return a non-empty result. The query evaluation module 104 verifies that the actual instantiated query, when submitted to the database, produces a non-empty result.

The system 100 can be used in different evaluation environments to satisfy different evaluation objectives. In one case, the system 100 can be used to provide unit testing for the database. For instance, the system 100 can be used to explore whether the database provides correct results when queried. In another case, the system 100 can be used to provide integrity checking for the database. For instance, the system 100 can be used to determine whether one or more functional properties or conditions hold for various scenarios. In another case, the system 100 can be used to provide security-related checking, and so on. For instance, the system 100 can be used to determine whether the database is effective in preventing the disclosure of private information (e.g., in response to an "attack query"). Still other applications of the system 100 are possible. In the case of unit testing, the condition information may describe a test criterion; in other applications, the condition information may describe some other identified outcome or aspect of the database.

In one particular implementation, the system 100 is provided as a standalone tool for evaluating databases. In another implementation, the system 100 is integrated with other database testing tools. In another implementation, the system 100 is integrated with one or more code-testing tools. No limitation is placed on the applications of the system 100 of FIG. 1.

In terms of physical implementation, the system 100 can be implemented by one or more computing devices. The computing device(s) can be either local or remote with respect to a user who interacts with the system 100. The computing device(s) can also be distributed over plural locations. FIG. 10, to be discussed in turn, shows illustrative processing functionality for implementing the system 100 according to one implementation.

As stated above, the QEX module 102 relies on a SMT-type solver module (not shown in FIG. 1) for generating the output information, such as, without limitation, the publically-available Z3 SMT solver provided by Microsoft Corporation of Redmond, Wash. The Z3 SMT solver is described in various publications, including: Leonardo de Moura, et al., "Z3: An Efficient SMT Solver," in *Tools and Algorithms for the Construction and Analysis of Systems*, Vol. 4963/2008, Apr. 3, 2008, pp. 337-340. By way of overview, a SMT solver module attempts to find a solution to a formula within a symbolic domain, essentially solving a combinatorial problem defined by multiple constraints.

In the context of the present disclosure, the QEX module 102 relies on the SMT solver module to generate table information and parameter information (if the query includes at least one parameter variable) such that the instantiated query, when submitted to the database, will produce the desired condition information. The QEX module 102 approaches this task by populating candidate tables with symbolic values and searching for a solution within a symbolic domain defined by those values (and the multiple constraints placed on those values, e.g., as defined, in part, by the database schema); the QEX module 102 can map the model produced by the SMT solver module back into concrete table information and parameter information.

Figure 2:
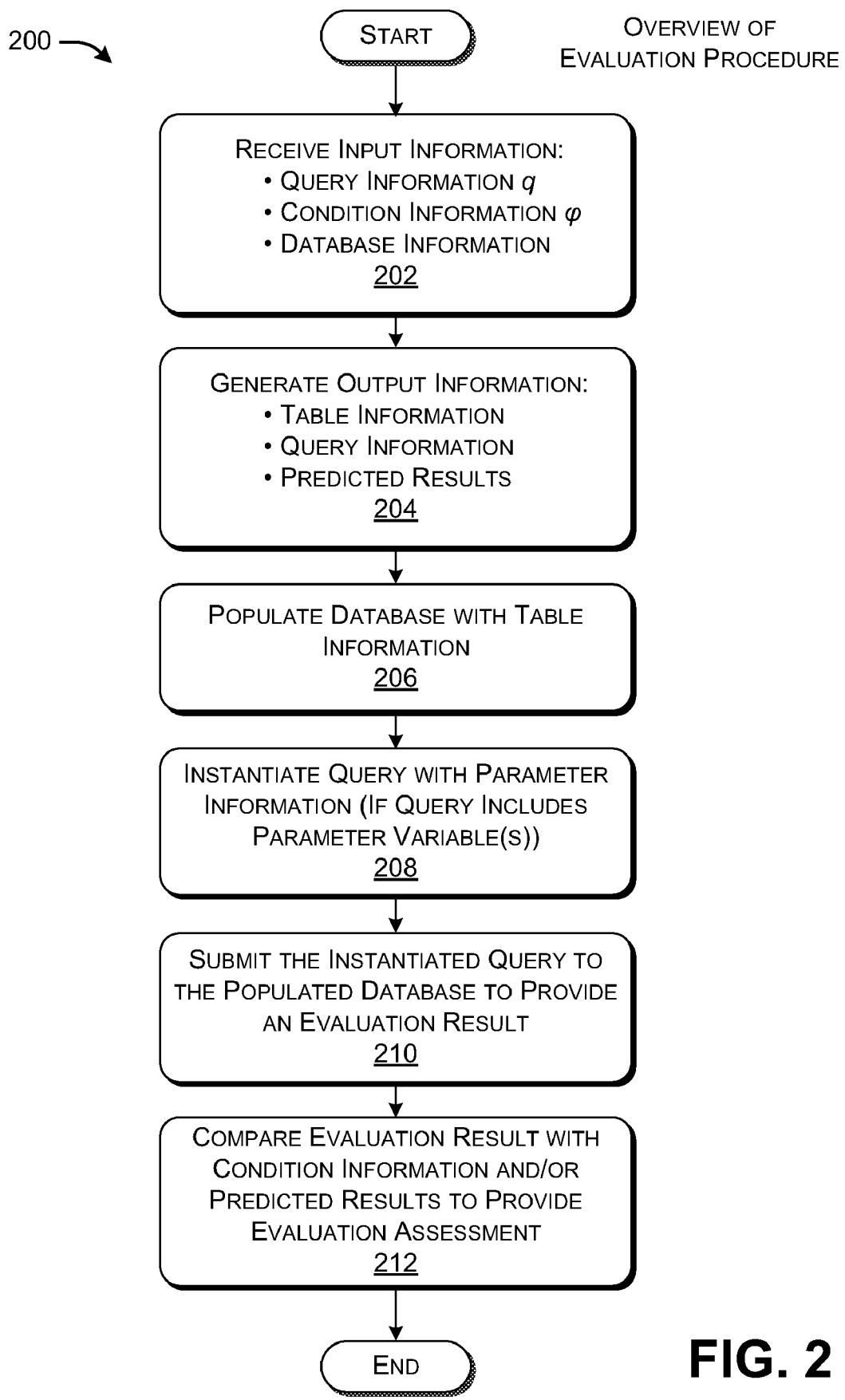
FIG. 2 shows a procedure which describes one illustrative manner of operation of the system of FIG. 1.

FIG. 2 shows a procedure 200 which describes the operation of the system 100 of FIG. 1 in flowchart form. Since the operation of the system 100 has already been described, certain blocks in FIG. 2 will be described in summary fashion below. In block 202, the QEX module 102 receives input information (as described above). In block 204, based on the input information, the QEX module 102 generates output information (as described above) using a SMT-type solver module.

In block 206, the query evaluation module 104 populates the database with the table information provided by the QEX module 102. In block 208, the query evaluation module 104 instantiates the query with the parameter information provided by the QEX module 102. In block 210, the query evaluation module 104 submits the instantiated query to the populated database, to produce an evaluation result. In block 212, the query evaluation module 104 compares an evaluation result with the condition information and/or the predicted result to provide an evaluation assessment.

Figure 3:
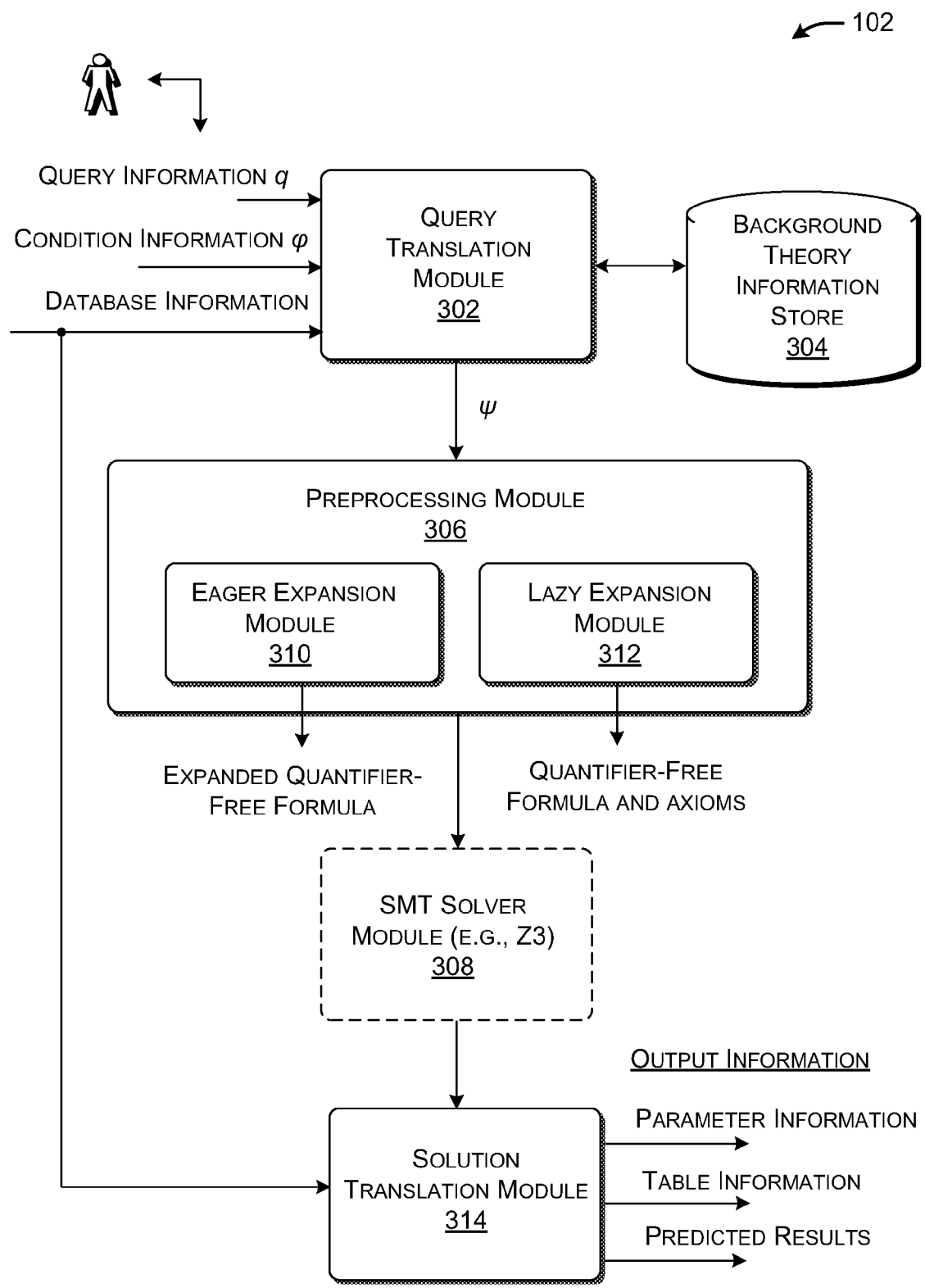
FIG. 3 is a more detailed depiction of the QEX module of FIG. 1.

FIG. 3 shows a more detailed depiction of the QEX module 102 of FIG. 1. The QEX module 102 includes a query translation module 302. The query translation module 302 receives the above-described input information, including query information, condition information, and database information. The query translation module 302 transforms the query identified in the query information into a formula expressed in a background theory $\mathcal{T}^\Sigma$. That is, the translation, represented by Q, leads to a subclass of expressions in $\mathcal{T}^\Sigma$ denoted by $\mathcal{T}^\Sigma_\mathbf{Q}$. In effect, the translation operation converts the query from a query language format (such as SQL) to a form that can be readily processed by the SMT solver module.

By way of overview, the background theory $\mathcal{T}^\Sigma$ provides information regarding the proper interpretation of a class of queries (because, otherwise, the SMT solver module will not "understand" the meaning of terms derived from the queries). For example, consider the expression $5<y<(x+2)$. Without further clarification, the variables x and y represent merely generic mathematical symbols. The background theory supplies the appropriate context to evaluate such an expression within a particular evaluation environment. For example, the background theory could define the symbols as natural numbers as opposed to rational numbers, or vice versa. The SMT solver module relies on such clarification in its attempt to find a solution. For example, in the case of rational numbers, the SMT solver module would consider fractional values for x and y in its attempt to find a solution; but in the case of natural numbers, the SMT solver module would not consider fractional values. In one implementation of the QEX module 102, the query translation module 302 relies on a fixed-state background theory $\mathcal{T}^\Sigma$ that can be used to encode one or more of: arithmetic, Booleans, tuples, finite sets, and algebraic data types (such as lists), etc.

Section B.1 provides a more formal mathematical description of the background theory $\mathcal{T}^\Sigma$, while Section B.2 provides a more formal mathematical description of illustrative rules for converting the query into the background theory $\mathcal{T}^\Sigma$. In the context of FIG. 3, the background theory is represented by background information stored in a background information store 304. The background information store 304 stores any rules and/or data in any form which can be used to map the query into the background information.

A preprocessing module 306 performs preprocessing on the formula provided by the query translation module 302 so as to facilitate the processing of the formula by a SMT solver module 308. The preprocessing module 306 can perform the preprocessing based on at least two modes of an operation. Namely, an eager expansion module 310 implements a first mode of operation, while a lazy expansion module 312 implements the second mode of operation. The QEX module 102 can rely on either of these modules or both of these modules in processing any particular formula.

The eager expansion module 310 expands the formula produced by the query translation module 302 before that formula is fed to the SMT solver module 308. In other words, the eager expansion module 310 expands or "winds out" the formula in an upfront manner. Expansion can assume different meanings for different expressions in the formula. In one case, the eager expansion module 310 operates by eliminating comprehensions and projected sums from the formula. Section B.3.1 (below) provides a more formal mathematical description of the operation of the eager expansion module 310.

The lazy expansion module identifies axioms that can be later called on by the SMT solver module 308 to expand the formula on an as-needed basis. These axioms provide rules for expanding the formula, in some cases acting as a recursive evaluation rule. The SMT solver module 308 invokes an axiom when it encounters a telltale pattern associated with the axiom during its processing of the formula. A pattern may correspond to a sub-expression in the formula that is associated with the axiom. Once encountered, the SMT solver module 308 replaces the sub-expression with an expanded version of the sub-expression. Alternatively, if a pattern is never matched in the above-indicated manner, the use of the corresponding axiom is not triggered. Effectively, the axioms represent query-dependent "soft theory" that is added to the stock analysis functions provided by the SMT solver module 308. Section B.3.2 (below) provides a more formal mathematical description of the operation of the lazy expansion module 312.

The preprocessing module 306 can also perform other mapping operations to transform the formula (and axioms, if used) into a form that can be readily processed by the SMT solver module 308. In other words, the preprocessing module 306 can perform whatever environment-specific mapping is appropriate to convert the formula (and axioms) into a native format expected by the SMT solver module 308.

FIG. 3 depicts the preprocessing module 306 as a post-processing module with respect to the query translation module 302. This reflects one actual implementation. In another case, the operations performed by the query translation module 302 and preprocessing module 306 can be integrated together in a single module.

The SMT solver module (e.g., the Z3 SMT solver) 308 processes the formula provided by the query translation module 302, as preprocessed by the preprocessing module 306. Generally, the SMT solver module 308 attempts to find a model or solution of the formula. More formally stated, given a (partially) fixed database and a parameterized query q, the QEX module 102 generates a model of $\phi([Q(q)])$, where $\phi$ represents a test criterion defined by the condition information (such as the result being non-empty). The formula is said to be satisfiable if it yields at least one model.

In one case, the QEX module 102 can call on a separate and standalone SMT solver module 308, e.g., the Z3 SMT solver module. For this reason, FIG. 3 illustrates the SMT solver module 308 in dashed lines (indicating that it may not form an integrated part of the QEX module 102). Other SMT solver modules that can be used include: Alt-Ergo, Ario, Barcelogic, Beaver, Boolector, CVC, CVC Lite, CVC3, DPT (Intel), Ext-SAT, Harvey, HTP, ICS (SRI), Jat, MathSAT, OpenSMT, Sateen, Simplify, Spear, STeP, STP, SVC, Sword, TSAT, UCLID, etc. In another implementation, the SMT solver module 308 is integrated with the QEX module 102.

A solution translation module 314 converts the model provided by the SMT solver module 308 into a concrete form that is suitable for conducting an evaluation of the database. More specifically, the SMT solver module 308 operates on an abstracted and symbolic version of table information, e.g., in which candidate tables are populated with symbolic values for analysis. For example, a certain column of a table may be declared to have a string type, but the QEX module 102 may treat the strings as enums. In view thereof, the solution translation module 314 can rely on domain-specific functions to map models generated by the SMT solver module 308 to corresponding concrete tables and parameter values for the query. For example, a value of 12 in a certain column may map to a corresponding string, "Bob." As shown in FIG. 3, the solution translation module 314 can rely on database schema information to perform this mapping task.

The QEX module 102 can optionally provide one or more user interface presentations that convey the results of its analysis to the user. FIG. 9, to be described in turn, shows one such illustrative user interface presentation. That user interface presentation can also optionally provide a command by which the user may instruct the evaluation module 104 to evaluate the actual database (e.g., in database store 106), based on the test data provided by the QEX module 102. Alternatively, the command may cause the QEX module 102 to display the automatically-generated code and/or test data that will implement the evaluation.

Figure 4:
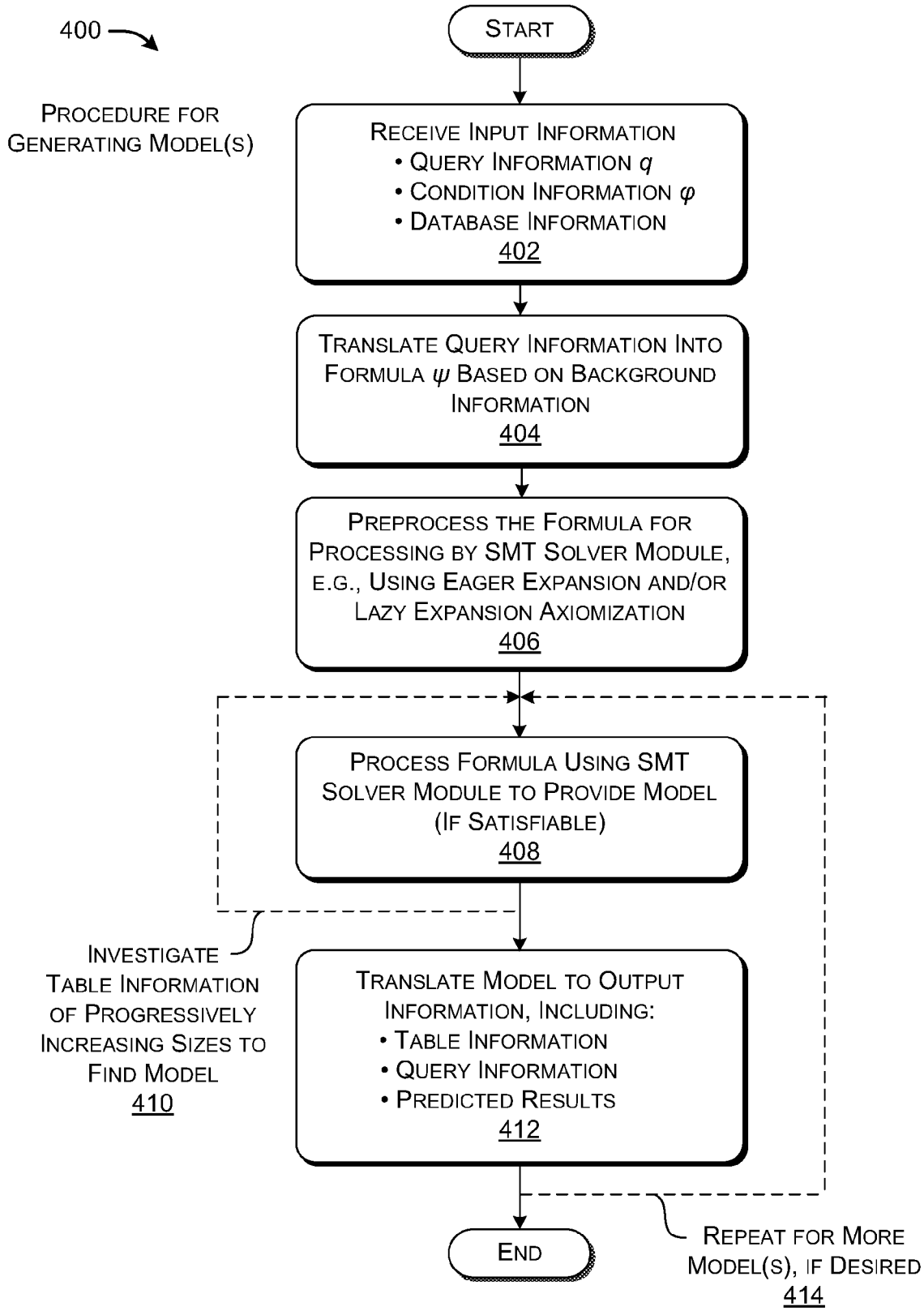
FIG. 4 shows a procedure which describes one illustrative manner of operation of the QEX module of FIG. 3.

FIG. 4 shows a procedure 400 which describes one illustrative manner of operation of the QEX module of FIG. 3. Since the operation of the system 100 has already been described, certain blocks in FIG. 4 will be described in summary fashion. In block 402, the QEX module 102 receives input information (as described above). In block 404, the QEX module 102 translates the query information into the background theory, to provide a formula, while preserving the original semantics of the query. At this juncture, the formula is not in a finite form, meaning that it can apply to table(s) of any size.

In block 406, the QEX module 102 preprocesses the formula to place it in a form that is suitable for processing by the SMT solver module 308, e.g., using eager expansion, lazy expansion, or a combination thereof. If eager expansion is used, the QEX module 102 expands the formula, e.g., for a particular candidate table size under consideration. This expansion is performed before sending the formula to the SMT solver module 308. If lazy expansion is used, the QEX module 102 generates axioms that may be called upon by the SMT solver module 308 in its processing of the formula. The QEX module 102 itself generates whatever axioms are appropriate based on the particular characteristics of a query under consideration. That is to say, different queries may rely on different respective sets of axioms.

In block 408, the SMT solver module 308 processes the formula in attempt to find a solution (model) to the formula. As indicated by a dashed line 410, the SMT solver module 308 may investigate candidate tables of progressively-increasing size, each candidate table being finite, but populated with symbolic variables for analysis. That is, the SMT solver module 308 may first attempt to find a model using the smallest table size possible (e.g., one row, if possible). If SMT solver module 308 is unsuccessful in finding a model, it may investigate a next largest table size. The SMT solver module 308 repeats this process until it finds a model (if one can be found). In the course of its search for a model, the SMT solver module 308 can invoke axioms associated with the lazy expansion approach, if this approach is being used for a particular application.

The above model-searching behavior can be carried out in different ways (or a combination of different ways). In one approach, the QEX module 102 can serve as the agent which controls the iterative behavior of the SMT solver module 308. For example, the QEX module 102 can first instruct the SMT solver module 308 to find a solution for the smallest table size. If the SMT solver module 308 is unsuccessful in providing a model, the QEX module 102 can next instruct the SMT solver module 308 to find a solution for the next-largest table size, and so on. At each iteration, the QEX module 102 can provide an eagerly-expanded formula for a particular finite table size (if eager expansion is used), and/or a formula in conjunction with one or more axioms (if lazy expansion is used). In this implementation, the dashed line 410 can be conceptualized as feeding back to at least the preprocessing operation in block 406.

Alternatively, or in addition, the QEX module 102 can formulate at least one upper bound table size. For example, the upper bound can specify that a table shall include no more than three rows (to cite merely an illustrative example). The QEX module 102 can then feed the upper bound to the SMT solver module 308, along with the formula and axioms (if used). In the course of attempting to find a solution, the SMT solver module 308 uses the upper bound as one more constraint among the myriad of constraints which govern its solution-finding operation. In this implementation, the SMT solver module 308 can be viewed as "internally" implementing the iterative behavior represented by the dashed line 410. (Hence, suffice it to say that the dashed line 410 only generally represents the systematic investigation of different table sizes; this iterative behavior can be implemented in different ways, as explained above.)

It is also possible to submit the formula to the SMT solver module 308 without any size constraints. One risk of this option is that it may render the problem of finding a solution undecidable. In this case, the SMT solver module 308 will continue to search for a solution without termination (until, for instance, a specified time-out period is reached).

In block 412, the QEX module 102 translates the model provided by SMT solver module 308 into a form such that it can be subsequently used to evaluate the database. The dashed line 414 indicates that the QEX module 102 can return to block 408 if another model to the formula is desired.

Figure 5:
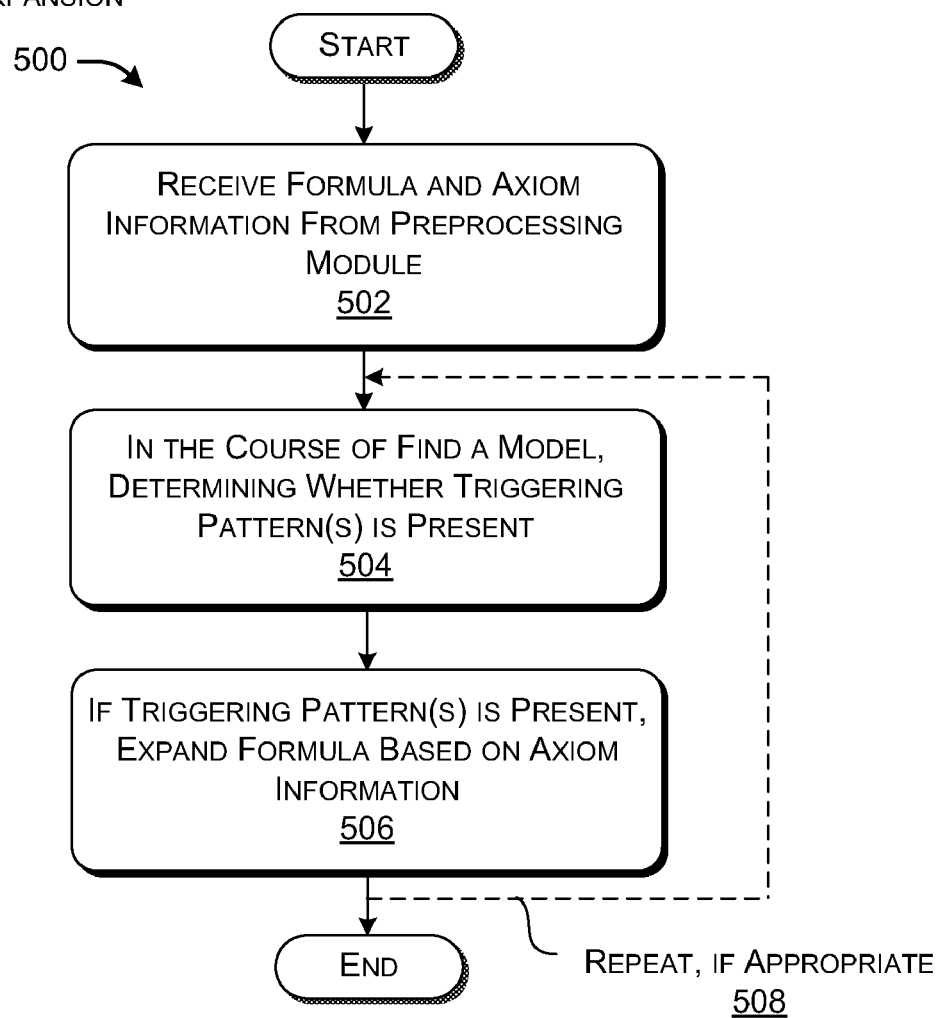
FIG. 5 shows a procedure which describes one illustrative manner of operation of a lazy expansion technique that can be performed by a satisfiability modulo theories (SMT) solver module, based on axioms provided by the QEX module of FIG. 3.
Figure 6:
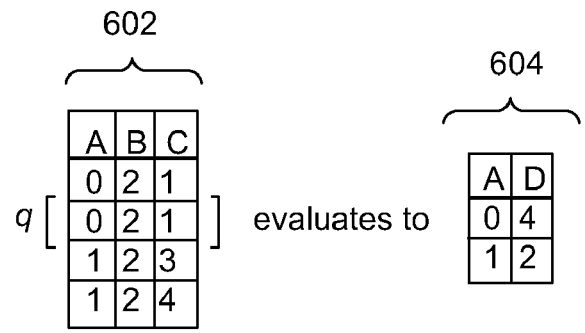
FIG. 6 shows information for use in explaining how the QEX module of FIG. 3 converts a query into a formula within a background theory.

FIG. 5 shows a procedure 500 which describes one illustrative manner of operation of a lazy expansion technique that can be performed by the SMT solver module 308 of FIG. 3, based on axioms provided by the preprocessing module 306. The procedure is described from the standpoint of the processing performed by the SMT solver module 308.

In block 502, the SMT solver module 308 receives a formula and axiom information from the preprocessing module 306. In block 504, the SMT solver module 308 determines whether a triggering pattern (or patterns) are present in the formula. In block 506, the SMT solver module 308 expands the formula based on the axiom information; this may involve replacing a sub-expression in the formula with an expanded version of the sub-expression.

This introductory section closes with a simplified example which demonstrates the principles set forth above.

Consider a database schema that specifies two tables, Customers and Orders. The Customers table has two columns, CustomerID and CustomerAge. The Orders table likewise has two columns, CustomerID and ProductID. The types of all values in the tables are positive integers. Further suppose that values in the CustomerAge column are constrained to be less than 100. In the terminology introduced above, all of this information constitutes database information which describes the characteristics of the database.

Let q be the following SQL query:

```
SELECT C. CustomerID, O. ProductID
FROM Orders AS O JOIN Customers AS C ON
                            O.CustomerID=C.CustomerID
WHERE C.CustomerAge<16 AND O.ProductID=22
```

The query q selects all customers from the database who are younger than 16 and who have ordered product 22. In the terminology used above, this original description of the query constitutes query information.

The query translation module 302 (in cooperation with the preprocessing module 306) translates the query q into a form that can be readily processed by the SMT solver module 308, based on an appropriate background theory that is sufficiently rich to capture the semantics of the query. In this example, the query translation module 302 declares two SMT variables, C and O, each having the type List<Integer, Integer>. In other words, both variables correspond to lists of pairs of integers that symbolically represent the content of the tables Customers and Orders, respectively.

More specifically, the query translation module 302 (in cooperation with the preprocessing module 306) creates a term Q(q) that encodes q as a term in the logic of the SMT solver module 308. The term can be expressed in simplified form as:

Select1(Join1(C,O))

Assume that the lazy expansion approach is being used. In this case, the Select1 and Join1 expressions are given recursive axioms (over lists) for processing by the SMT solver module 308. The axioms for Join1 define a cross-product of O and C, such that the result is a list of 4-tuples of integers, where tuple element positions 0 and 1 correspond to the columns of table C and positions 2 and 3 correspond to columns of table O and where element 0 and element 2 are equal (representing the ON-condition in q). The axioms for Select1 have the following form, selecting the tuple elements 0 and 2 and filtering out elements that do not satisfy the WHERE-condition in q.

```
Select1(nil)=nil
(∀ row rest)Select1(cons(row, rest) =
        if(row.0=row.2 and row.1<16 and row.3==22)
        then cons(<row.0, row.3>, Select1(rest)) else Select1(rest)
```

In addition to q, a test condition is given. Suppose that the test condition is "the result of the query is non-empty." The corresponding formula that is fed to the SMT solver module 308 is therefore:

Select1(Join1(C,O)≠nil

The SMT solver module 308 can process this formula in the manner described below. To begin with, n and m are both set to 1.

In operation (1), the QEX module 102 adds the following constraints for submission to the SMT solver module 308: $C=cons(C_1, \ldots cons(C_n, nil))$ and $O=cons(O_1, \ldots cons(O_m, nil)$, where $C_1, \ldots C_n$ and $O_1, \ldots O_m$ are new variables that symbolically represent the rows of the two tables.

In operation (2), the QEX module 102 may add additional constraints, such as a range condition for a column (as defined, for instance, by the database schema). For example, the QEX module 102 can add constraints that specify that the values in the tables are positive, e.g., $C_1.0>0, \ldots, C_n.0>0$, and $C_1.1>0, \ldots, C_n.1>0$, etc., and $O_1.0>0, \ldots, O_m.0>0$, etc. Further, the QEX module 102 can add constraints that specify an upper bound for age, e.g., $C_1.1<100, \ldots, C_n.1<100$, etc. These constraints are merely representative. There may be other constraints, such as a constraint that specifies that all of the $C_i.0$'s are distinct because they are keys.

In operation (3), the QEX module 102 asks the SMT solver module 308 for a model (e.g., a solution to the formula that satisfies all of the constraints). If a model is found, the QEX module 102 advances to operation (4) below. If no model is found, the QEX module 102 systematically increases n and m and returns to operation (1), unless a timeout is reached, upon which the QEX module 102 terminates its processing without finding a model. As discussed above in connection with FIG. 4, the QEX module 102 can implement this iterative behavior in alternative (or additional) ways. For example, the QEX module 102 can specify at least one upper bound on the table size; this upper bound acts as a constraint to be taken into consideration by the SMT solver module 308 as it searches for a solution.

In operation (4), the model (represented here by M) is output. The model provides concrete values for C and O (and thus also for each $C_i$ and $O_i$). For example, assume that the model that satisfies all the constraints is:

M(C)=cons(<1067,14>, nil) and M(O)=cons(<1067, 22>,nil).

In the above simplified example, the query q did not include any variable parameters. In another case, the query q can include one or more variable parameters. For example, instead of the fixed age limit 16, another query could provide the variable parameter @age. (Variable parameters are prefixed with the @ sign in the examples set forth here; however, other query languages may use other conventions to represents parameter variables). In the case such a variable parameter is present, the SMT solver module 308 can also generate a concrete age limit in place of the variable parameter.

Finally, once a model M is found, the concrete values provided by M are translated into tables (and parameter values, if any). For example, M(C)=cons(<1067,14>, nil) is translated into a Customer table row in which: CustomerID=1067 and CustomerAge=14. M(O)=cons(<1067,22>, nil) is translated into an Orders table row in which: CustomerID=1067 and ProductID=22. This information constitutes table information in the terminology used above. If parameters were generated by the SMT solver module 308, this information would constitute parameter information in the terminology used above.

Subsequently, the query evaluation module 104 uses the table information determined above to populate the database. Further, the query evaluation module 104 instantiates the query with the determined parameter value(s) (if any). Then the query evaluation module 104 executes the instantiated query against the populated database and checks if the result of the query satisfies the test condition.

In the above example, the QEX module 102 used the lazy expansion approach by first generating axioms for the SMT solver module 308 to expand on an as-needed basis. In another approach, the QEX module 102 can use eager expansion, in which case the QEX module 102 expands or "winds out" the formula before sending it to the SMT solver module 308.

B. Illustrative Formal Description

This section provides a more formal, e.g., mathematical, description of the operation of the QEX module 102. Namely, Section B.1 describes an illustrative background theory for use in interpreting a class of queries. Section B.2 describes functionality for translating the queries into the background theory. Section B.3 describes functionality for preprocessing formulas (in the background theory) for submission to the SMT solver module 308, and then for processing the formulas in the SMT solver module 308. Section B.4 describes unit tests performed on a particular database using the QEX module 102.

B.1. Background Theory

As summarized above, the QEX module 102 uses the query translation module 302 to translate an input query into a formula within a background theory $\mathcal{T}^\Sigma$. This operation has the effect of converting the query from an original form (expressed in SQL or other query language) into a logical form that can be readily processed by the SMT solver module 308. This subsection describes illustrative characteristics of the background theory which enables this conversion. In general, the background theory can be viewed as a source for supplying the interpretative assumptions which underlie various expressions which can be expected to appear in a certain class of SQL statements.

In one implementation, the QEX Module 102 uses a fixed-state background theory $\mathcal{T}^\Sigma$ that includes one or more of at least: arithmetic, Booleans, tuples, finite sets, and algebraic data types (e.g., lists), etc. The universe defined by the background theory $\mathcal{T}^\Sigma$ is thus multi-sorted, with all values having a fixed sort. The sorts $\mathbb{Z}$, $\mathbb{R}$, and $\mathbb{B}$ refer to integers, reals, and Booleans, respectively. $\mathbb{Z}$ and $\mathbb{R}$ are called numeric sorts. The sorts $\mathbb{Z}$, $\mathbb{R}$, and $\mathbb{B}$ are basic. The tuple sort $\mathbb{T}(\sigma_0, \ldots, \sigma_k)$ is also basic, provided that each $\sigma_i$ is basic. The set sort $\mathbb{S}(\sigma)$ is not basic and specifies $\sigma$ to be basic.

The universe of all values of sorts $\sigma$ is denoted by $\mathcal{U}^\sigma$. Universes of distinct sorts are disjoint. In one approach, it can be assumed that for distinct set sorts $\sigma_1$ and $\sigma_2$, the empty set is shared. But in the approach taken herein, it can be assumed that there is a distinct empty set for each set sort. Either assumption is satisfactory, because all expressions in $\mathcal{T}^\Sigma$ are well-sorted.

For each sort $\sigma$, there is a specific Default$^\sigma$ in $\mathcal{U}^\sigma$. In particular, Default$^\mathbb{B}$=false, Default$^\mathbb{Z}$=0, Default$^\mathbb{R}$=0, and Default$^{\mathbb{S}(\sigma)}$=∅. For a tuple sort, the Default tuple is composed of the Default's of the respective element sorts. There is a function AsReal: $\mathcal{U}^\mathbb{Z} \to \mathcal{U}^\mathbb{R}$ that maps integers to corresponding reals.

This description refers to a sort $\sigma$ together with a semantic constraint on $\mathcal{U}^\sigma$ as a type. In particular, the type $\mathbb{Z}^+$ refers to the positive integers; that is, the constraint is $\forall x_{\mathbb{Z}^+}(x>0)$. An enum or k-enum type refers to integers 0 through k-1 for some k>0.

B.1.1. Expressions

The QEX module 102 uses an expression language that is also referred to as $\mathcal{T}^\Sigma$. Well-formed expressions or terms of $\mathcal{T}^\Sigma$ are defined in the following table:

TABLE 1

| Well-Formed Expressions in $\mathcal{T}^\Sigma$ | |
|---|---|
| $T^\sigma$ | ::= x$^\sigma$\|Default$^\sigma$\|Ite($T^\mathbb{B}$ $T^\sigma$,$T^\sigma$)\|TheElementOf( $T^{\mathbb{S}(\sigma)}$)\| $\pi_i(T^{\mathbb{T}(\sigma_0,\ldots,\sigma_i=\sigma,\ldots)})$ |
| $T^{\mathbb{T}(\sigma_0,\ldots,\sigma_k)}$ | ::= $\langle T^{\sigma_0},\ldots,T^{\sigma_k}\rangle$ |
| $T^\mathbb{Z}$ | ::= k\| $T^\mathbb{Z} + T^\mathbb{Z}$\|k * $T^\mathbb{Z}$\|$\Sigma_i(T^{\mathbb{S}(\mathbb{T}(\sigma_0,\ldots,\sigma_i=\mathbb{Z},\ldots))})$ |
| $T^\mathbb{R}$ | ::= r\| $T^\mathbb{R} + T^\mathbb{R}$\|k * $T^\mathbb{R}$ * $\Sigma_i(T^{\mathbb{S}(\mathbb{T}((\sigma_0,\ldots,\sigma_i=\mathbb{R},\ldots))})$ \| AsReal( $T^\mathbb{Z}$) |
| $T^\mathbb{B}$ | ::= true\|false\|¬$T^\mathbb{B}$\| $T^\mathbb{B} \wedge T^\mathbb{B}$\| $T^\mathbb{B} \vee T^\mathbb{B}$ |
| | $T^\sigma = T^\sigma$\| $T^{\mathbb{S}(\sigma)} \subseteq T^{\mathbb{S}(\sigma)}$\| $T^\sigma \in T^{\mathbb{S}(\sigma)}$\| $T^\mathbb{Z} \leq T^\mathbb{Z}$\| $T^\mathbb{R} \leq T^\mathbb{R}$ |
| $T^{\mathbb{S}(\sigma)}$ | ::= $X^{\mathbb{S}(\sigma)}$\{$T^\sigma\|_x T^\mathbb{B}$\}\| $T^{\mathbb{S}(\sigma)} \cup T^{\mathbb{S}(\sigma)}$\| $T^{\mathbb{S}(\sigma)} \cap T^{\mathbb{S}(\sigma)}$\| $T^{\mathbb{S}(\sigma)} \setminus T^{\mathbb{S}(\sigma)}$ |
| F | ::= $T^\mathbb{B}$\|∃xF\|∃X F |

A term t of sort $\sigma$ is written as t$^\sigma$; x$^\sigma$ is a variable of basic sort $\sigma$; X$^\sigma$ is a variable where $\sigma$ is a set sort. According to the convention used herein, upper case letters are used for set variables. Boolean terms are also called formulas. The assumption is made that terms are well-sorted; but sorts are omitted when they are clear from the context. The set of free variables of a term t is denoted by FV(t); these are all the variables that have an occurrence in t that is not in the scope of the quantifier. In particular, FV($\{t|_x\phi\}$)=(FV(t)∪ FV($\phi$))\\{x}, where $|_x$ is the comprehension quantifier. A term without free variables is a closed term. The expression t[$x_0, \ldots, x_{n-1}$] is written for a term t, where each $x_i$ may occur free in t. Let $\theta$ refer to the substitution $\{x_i \mapsto t_i\}_{i<n}$ (where $x_i$ and $t_i$ have the same sort). (The general assumption is made herein that substitutions are well-sorted in this sense). t$\theta$ denotes the application of $\theta$ on t. Further, the expression t[$t_0, \ldots, t_{n-1}$] is written for t$\theta$. For example, if t[x] is the term Ite($\{x|_x\phi\}$=Ø, x+x,x) and $\theta=\{x \mapsto x+y\}$, then t$\theta$ or t[x+y] is the term Ite($\{x|_x\phi\}$=Ø, (x+y)+(x+y),x+y).

In the ensuing explanation, the variables $\bar{x}$ are often omitted from the comprehension quantifier $|_{\bar{x}}$ when they are clear from the context of use. Further, the explanation uses additional definitions pertaining to $\mathcal{T}^\Sigma$ when appropriate. When a definition is apparent (such as x<y), it is used without further explanation. Further, the abbreviation x.i is often used for $\pi_i(x)$.

A term in $\mathcal{T}^\Sigma$ of the form $\{x|x=t_1 \vee \ldots \vee x=t_n\}$ (where x is not free in any $t_i$) is abbreviated by $\{t_1, \ldots, t_n\}$ and is not considered as a comprehension term, but as an explicit set term.

B.1.2. Semantics

A state S is a mapping of variables to values. Since $\mathcal{T}^\Sigma$ is assumed to be the background, it is omitted from S, and it is assumed that S has an implicit part that includes the interpretation for the function symbols of $\mathcal{T}^\Sigma$. For example, it is assumed that + means addition and ∪ refers to set union. The function symbols in Table 1 can also be reused to denote their interpretations; for example, the expression $\pi_i$ can be written for $\pi_i^{\mathcal{T}^\Sigma}$. The context in which an expression is used clarifies whether reference is being made to a symbol or its interpretation in $\mathcal{T}^\Sigma$. The expression Dom(S) is written for the domain of S. Given two states $S_1$ and $S_2$, the expression $S_1 \uplus S_2$ refers to the union of $S_1$ and $S_2$, but where the variables in Dom($S_1$) ∩ Dom($S_2$) have the value in $S_2$.

A state for a term t is a state S such that FV(t) ⊆ Dom(S). Given a term t and a state S for t, $t^S$ is the interpretation or evaluation of t in S, defined by induction over the structure of t. Given a formula $\phi$ and a state S for $\phi$, S$\models\phi$ means that $\phi^S$ is true. Besides the standard logical connectives, arithmetical operations and set operations, Equations (1-4) below show the semantics for the nonstandard constructions of t in the expressions in Table 1.

$$Ite(\varphi, t_1, t_2)^S = \begin{cases} t_1^S, & \text{if } S \models \varphi; \\ t_2^S, & \text{otherwise.} \end{cases} \quad (1)$$

$$TheElementOf(t_1^{\mathbb{S}(\sigma)})^S = \begin{cases} a & \text{if } t_1^S = \{a\}; \\ Default^\sigma, & \text{otherwise.} \end{cases} \quad (2)$$

$$\{t_0 |_{x^\sigma} \varphi\}^S = \{t^{S \uplus \{x \mapsto a\}} : a \in \mathcal{U}^\sigma, S \uplus \{x \mapsto a\}\} \models \varphi\} \quad (3)$$

$$\sum_i (t_1)^S = \sum_{a \in t_1^S} \pi_i(a) \quad (4)$$

The interpretation of a comprehension with several variables is a straightforward generalization of Expression (3). In Expression (3), it is assumed that there are only finitely many a such that S $\uplus\{x \mapsto a\}\models\phi$; otherwise it may be assumed that $\{t_0|_{x^\sigma}\phi\}^S$ is Ø. (In the translation from the query to $\mathcal{T}^\Sigma$, finiteness is guaranteed by construction.) The use of comprehensions as terms is well-defined since sets are extensional; that is, $\forall XY(\forall z(z\in X \Leftrightarrow z\in Y)\Leftrightarrow X=Y)$. (Extensibility of sets is a meta-level property that is not expressible in $\mathcal{T}^\Sigma$).

As explained in Section A, a state S for a formula $\phi$ such that S$\models\phi$ is a model of $\phi$. A formula $\phi$ is satisfiable if there exists a model of $\phi$. The formula $\phi$ is valid if all states for $\phi$ are models of $\phi$.

For a closed term t, the explanation herein refers to the evaluation of t, without reference to any particular state.

For the case of multiplication, the following definition is provided for n*m with $\Sigma_0$, where n>0 is an integer:

$$n*m \stackrel{def}{=} \Sigma_0(\{\langle m, x\rangle | 0 \leq x < n\}) = \sum_{x=0}^{n-1} \pi_0(\langle m, x\rangle) = \sum_{x=0}^{n-1} m \quad (5)$$

Note that m may be an integer or a real and the sort of m determines the sort of n*m. Thus, the projected sum operation $\Sigma_i$ is very powerful and in the general case leads to undecidability of very restricted fragments of $\mathcal{T}^\Sigma$.

Bags or multisets are presented as graphs of maps with positive integer ranges. For example, a bag b with elements $\{a_i\}_{i<n}$ in each having multiplicity $m_i>0$ in b for i<n, is represented as a set of pairs $\{\langle a_i, m_i\rangle\}_{i<n}$, thus having the sort $\mathbb{S}(\mathbb{T}(\sigma, \mathbb{Z}))$ for some basic sort $\sigma$ called the domain sort of b. Let $\mathbb{M}(\sigma)$ be the type $\mathbb{S}(\mathbb{T}(\sigma, \mathbb{Z}^+))$ with the additional map constraint:

$$\forall X^{\mathbb{M}(\sigma)} \forall x^\sigma y^\sigma ((x \in X \wedge y \in X \wedge x.0=y.0) \rightarrow x.1=y.1).$$

The following definitions are used for dealing with bags:

$$AsBag(Y^{\mathbb{S}(\sigma)}) \stackrel{def}{=} \{\langle y, 1\rangle | y \in Y\}$$

$$AsBag(X^{\mathbb{M}(\sigma)}) \stackrel{def}{=} \{y.0 | y \in X\}$$

$$\sum_i^b (X^{\mathbb{M}(\mathbb{T}(\sigma_0, \ldots, \sigma_i, \ldots))}) \stackrel{def}{=} \sum_0 (\{\langle x.1 * x.0.i, x.0\rangle | x \in X\})$$

($\sigma_i$ is numeric)

Intuitively, AsSet(X) eliminates the duplicates from X. $\Sigma_i^b$ is a generalization of the projected sum over sets to bags. Note that x.1 above is always positive (thus, the use of * is well-defined). Note that an expression like $X^{\mathbb{M}(\sigma)} \cup Y^{\mathbb{M}(\sigma)}$ is a well-formed expression in $\mathcal{T}^\Sigma$, but it does not preserve the type $\mathbb{M}(\sigma)$.

Example 1

Let q[$X^{\mathbb{M}(\mathbb{T}(\mathbb{Z},\mathbb{Z},\mathbb{Z}))}$] be the following expression, where $\phi$[x] is the following formula: x<4.

$$q[X]=\{\langle x.0.0, \Sigma_1^b(\{y|y\in X\wedge x.0.0=y.0.0 \wedge \phi[y.0.2]\})\rangle | x\in X\wedge\phi[x.0.2]\}$$

Let t=$\{\langle\langle 0,2,1\rangle, 2\rangle, \langle\langle 1,2,3\rangle, 1\rangle, \langle\langle 1,2,4\rangle, 1\rangle\}$. Consider the evaluation of q[t].

$$q[t] = \left\{\left\langle x.0.0, \sum_{1}^{b} (\{y \mid y \in t \wedge x.0.0 = y.0.0 \wedge \varphi[y.0.2]\})\right\rangle \middle| \right.$$
$$x \in t \wedge \varphi[x.0.2]\}$$

$$= \left\{\left\langle 0, \sum_{1}^{b} (\{y \mid y \in t \wedge 0 = y.0.0 \wedge \varphi[y.0.2]\})\right\rangle,\right.$$

$$\left\{\left\langle 1, \sum_{1}^{b} (\{y \mid y \in t \wedge 1 = y.0.0 \wedge \varphi[y.0.2]\})\right\rangle\right\}$$

$$= \left\{\begin{array}{l}\left\langle 0, \sum_{a \in \{\langle\langle 0,2,1\rangle,2\rangle\}} \pi_1(a) * \pi_1(\pi_0(a))\right\rangle, \\ \left\langle 1, \sum_{a \in \{\langle\langle 1,2,3\rangle,1\rangle\}} \pi_1(a) * \pi_1(\pi_0(a))\right\rangle\end{array}\right\}$$

$$= \{\langle 0, 4\rangle, \langle 1, 2\rangle\}$$

B.2. From SQL to $\mathcal{T}^\Sigma$

This section provides additional information regarding the operation of the query translation module 302. As summarized above, the query translation module 302 translates a class of SQL queries into $\mathcal{T}^\Sigma$. The translation is referred to as Q:SQL→$\mathcal{T}^\Sigma$. The explanation in this section takes the form of a series of examples and templates. These examples illustrate how different expressions in an SQL query can be converted into a more logical form for processing by the SMT solver module 308; hence, this subsection devotes separate explanations to different respective possible aspects of an input query (e.g., data types, nullable values, query expressions, select clauses, join operations, groupings and aggregates, and simplifications, etc.).

More specifically, this section applies to queries without side-effects, and takes into consideration a subset of SELECT statements. (However, extensions of this approach are possible for analyzing queries with side-effects.) In the general case, tables and results of queries are represented as bags whose domain sort is a tuple.

B.2.1. Data Types

Typical databases use additional data types besides numbers and Booleans. In particular, strings are used in virtually every database. There are at least two approaches that can be taken to support these data types. In one approach, the data types are encoded in the above-described $\mathcal{T}^\Sigma$ (which does not take particular account for strings). Another approach is to extend $\mathcal{T}^\Sigma$ to encompass the corresponding sorts and background theories (associated with strings). The first approach is adopted in the explanation below. The main advantage of the first approach is that it involves a smaller core to be dealt with in the context of analysis, as discussed in the next section. One disadvantage is that encoding may incur an overhead that may be more expensive than the use of a built-in theory (associated with strings).

Strings can be encoded in $\mathcal{T}^\Sigma$ using different approaches. Suppose that, for instance, in a given column, all strings have a maximum length k; a possible encoding of a k-string is as a k-tuple of integers, where each character a is encoded as an integer c(a) in the range [1, 255]. A further constraint associated with this encoding is that it has the form $\langle c(a_0), \ldots, c(a_l), 0, \ldots, 0\rangle$ for a string $a_0 \ldots a_l$ for l<k, and the empty string is the Default of the tuple sort. Operations over k-strings, such as the extraction of a substring, can then be defined in terms of tuple operations.

Commonly, a collection of strings D are used as enums in a given column (for example names of persons), and the only string operations that are relevant are equality and lexicographic ordering $\leq_{lex}$ over strings in D. In this case, a bijection can be defined as $f_D$: D→[0, |D|−1] such that, for all a, b∈D, $a \leq_{lex} b$ iff $f_D(a) \leq f_D(b)$; the strings in D are encoded as |D|-enums.

B.2.2. Nullable Values

The QEX module 102 encodes nullable values with tuples. Given a basic sort σ, let $\breve{\sigma}$ be the sort $\mathbb{T}(\sigma, \mathbb{B})$ with the constraint $\forall x(x.1=\text{false} \rightarrow x.0=\text{Default}^\sigma)$ and $$null^{\breve{\sigma}} \stackrel{def}{=} Default^{\mathbb{T}(\sigma,\mathbb{B})}.$$

Operations that are defined for σ are lifted to $\breve{\sigma}$. For example, for a numeric sort σ, $$x^{\breve{\sigma}} + y^{\breve{\sigma}} \stackrel{def}{=} Ite(x.1 \wedge y.1, \langle x.0 + y.0, \text{true}\rangle, null^{\breve{\sigma}}).$$

The projected sum operation is lifted in analogous fashion. The sorts $\mathbb{T}(\sigma, \mathbb{B})$ are not used to represent any other data types besides $\breve{\sigma}$. This encoding introduces an overhead for the symbolic analysis and is avoided unless the corresponding value type is declared nullable.

B.2.3. Query Expressions

Next consider top-level query expressions that have the form query_expr according to the following simplified grammar:

query_expr::=select|(query_expr set_operation query_expr)

set_operation::=UNION|EXCEPT|INTERSECT select::=SELECT [DISTINCT] select_list
FROM table_src [WHERE condition] [group_by_having]

Set operations such as UNION remove duplicate rows from the arguments and the resulting query. In particular, the translation for UNION is:

$$Q(q1 \text{ UNION } q2) \stackrel{def}{=} AsBag(AsSet(Q(q1)) \cup AsSet(Q(q2)))$$

The other set operations have a similar translation.

B.2.4. Select Clauses

A select clause refers to a particular selection of the columns from a given table by using a select_list. In the following, a select_list 1 is translated into a sequence of projection indices $(l_0, \ldots, l_n)$ on the table on which the selection is applied.

$$Q(\text{SELECT } 1 \text{ FROM } t) \stackrel{def}{=} \{\langle\langle x.0.l_0, \ldots, x.0.l_n\rangle, M(x)\rangle \mid x \in Q(t)\} \quad (6)$$

where $$M(x) = \sum_0 (\{\langle y.1, y\rangle \mid y \in Q(t) \wedge \wedge_{i=0}^n y.0.l_i = x.0.l_i\})$$

Note that multiplicities of the resulting tuples are computed separately, which is appropriate to preserve the type of the result as a bag. For example, the following is not a valid translation, unless 1 is *.

$$\{\langle\langle x.0.l_0, \ldots, x.0.l_n\rangle, x.1\rangle \mid x \in Q(t)\}$$

(The above expression does not represent a bag in general.) If the DISTINCT keyword is used, then duplicate rows are removed.

$$Q(\text{SELECT DISTINCT 1 FROM } t) \stackrel{def}{=}$$
$$AsBag(AsSet(Q(\text{SELECT 1 FROM } t)))$$

The following property is used in the set conversion:

$$AsSet(Q(\text{SELECT 1 FROM } t)) = \{\langle y.l_0, \ldots, y.l_\gamma \rangle | y \in AsSet(Q(t))\} \quad (7)$$

An operational WHERE condition is translated into a formula in $\tau^\Sigma$ and appears as an additional condition in the above comprehensions.

B.2.5. Join Operations

Join operations are used in FROM statements. In general, a FROM statement takes an argument table_src, that, in simplified form, has the grammar:
    table_src::=table_name [AS alias] |joined_table
    joined_table::=table_src join table_src ON condition
    join::=[{INNER|{{LEFT|RIGHT|FULL} [OUTER]}}] JOIN The condition may use column names of the (aliased) tables and operations on the corresponding data types. The case of INNER JOIN is given as follows:

$$Q(t1 \text{ INNER JOIN } t2 \text{ ON } c) \stackrel{def}{=} \{\langle x_1.0 \times x_2.0, x_1.1 * x_2.1 \rangle | \quad (8)$$
$$x_1 \in Q(t1) \wedge x_2 \in Q(t2) \wedge Q(c)[x_1.0, x_2.0]\}$$

Here, $Q(c)[y_1, y_2]$ denotes the translation of the condition c to the corresponding formula in $\tau^\Sigma$, where the column names referring to the tables t1 and t2 occur as corresponding tuple projection operations on $y_1$ and $y_2$, respectively. The operation x is defined as follows, where x is an m-tuple and y is an n-tuple:

$$x \times y \stackrel{def}{=} \langle \pi_0(x), \ldots, \pi_{m-1}(x), \pi_0(y), \ldots, \pi_{n-1}(y) \rangle$$

The following property holds for the translation:

$$AsSet(Q(t1 \text{ INNER JOIN } t2 \text{ ON } c)) = \{y_1 \times y_2 | y_1 \in AsSet(Q(t1)) \wedge y_2 \in AsSet(Q(t2)) \wedge Q(c)[y_1, y_2]\} \quad (9)$$

B.2.6. Groupings and Aggregates

A common construct is the combined use of GROUP BY with aggregate operations. A group_by_having expression has the following (simplified) grammar:
    group_by_having::=group_by [HAVING condition]
    group_by::=GROUP BY group_by_list
    group_by_list::=group_by_item [, ..., n]

This expression appears in a select expression, the grammar of which is shown above; there is a context condition that specifies that the columns in select_list that are not included in group_by_list are to be applied to aggregate operations. The context condition is used to eliminate duplicate rows produced by the select clause by combining the values in the columns not in the group_by_list into a single value for the given column. Here, aggregates in combination with grouping are considered. (In general, aggregates may also be used in a select expression without using grouping.) Illustrative aggregate operations include SUM, COUNT, MAX, and MIN.

Example 2

Assume that X is a table with the columns (A, B, C) where each column has integer type. Consider the following query q.
    SELECT A, SUM(B) AS D
    FROM X
    WHERE C<4
    GROUP BY A Q(q) is AsBag(q[X]) with q [X] as in Example 1 above. Referring to FIG. 5, it is shown how table 602 evaluates to table 604.

In order to simplify the presentation, assume that select_list and group_by_list are like in Example 2. The translation is as follows, where t is SELECT a SUM(b) AS d FROM t1 WHERE c1, $$Q(t \text{ GROUP BY } a \text{ HAVING } c2) \stackrel{def}{=}$$
$$AsBag(\{z | z \in G \wedge Q(c2)[z]\})$$

where $$G = \left\{ \left\langle x.0.0, \sum_{1}^{b}(\{y|y \in Q(t) \wedge y.0.0 = x.0.0\}) \right\rangle \mid x \in Q(t) \right\}$$

Note that the condition y.0.0=x.0.0 corresponds to group_list. Note also that c2 is applied to the result G of the grouping; further, in the formula Q(c2)[z], z.0 corresponds to a and z.1 corresponds to d. The other aggregates are translated in a similar manner. For example, if SUM(b) is replaced by COUNT(b), then in the above translation $\Sigma_1^b$ is replaced by $$\text{Count} \stackrel{def}{=} \Sigma_1.$$

For MIN and MAX, the projected sum operation is not needed, for example:

$$\text{Min}(X^{\mathbb{S}(\sigma)}) \stackrel{def}{=} TheElementOf(\{y | y \in X \wedge \{z | z \in X \wedge z < y\} = \emptyset\}) \quad (10)$$

The aggregate AVG can be translated as $\Sigma_i^b(X) \div \text{Count}(X)$, where ÷ denotes division by positive integer in R and can be defined as follows:

$$r \div k \stackrel{def}{=} TheElementOf(\{x^R | k * x = r\}). \quad (11)$$

B.2.7. Simplifications

Many operations convert bags into sets. There are further simplifications rules besides Expressions (7) and (9) that can be used for this task. These rules are based on the following properties between bag and set operations and are used in the translation to reduce operations over bags to operations over sets, whenever possible.

$$AsSet(AsBag\ X^{\mathbb{S}(\sigma)}) = X$$

$$\Sigma_i^b(AsBag(X^{\mathbb{S}(\sigma)})) = \Sigma_i(X)$$

$$AsSet(\{t|\phi\}^{\mathbb{M}(\sigma)}) = \{t.0|\phi\}$$

Moreover, further simplifications are performed at the level of basic sorts, such as $\pi_i(\langle t_0, \ldots, t_i, \ldots \rangle) = t_i$, that are also used as part of the simplification process. More specifically, the simplifications are part of an equivalence-preserving post-processing phase of Q(q) for a given query q.

As a result of the operations described above in Section B.2, the query translation module 302 performs a translation Q to convert a query q into a subclass of expressions in $T^\Sigma$, denoted by $T_Q^\Sigma$.

B.3. Formula Expansion and Model Generation

This section describes the manner in which the preprocessing module 306 and the SMT solver module 308 cooperatively generate models in $T_Q^\Sigma$.

The SMT solver module 308 operates in the manner summarized in Section A. Formally stated, given a quantifier-free formula $\phi[X]$ in $T^\Sigma$, and a query q, the SMT solver module 308 decides if $\psi = \phi[Q(q)]$ is satisfiable; if so, the SMT solver module 308 generates a model of $\psi$. In the larger context, the SMT solver module 308 finds a model that yields table information (for use in a database) for a given query such that the query satisfies a certain property. A query may also include parameters; for example, in Example 2, the constant 4 can be replaced by a parameter variable @x. Thus, the SMT solver module 308 performs parameter generation as well as database generation. Thus, in summary, given a (partially) fixed database and a parameterized query q, the SMT solver module 308 generates a model of $\phi[Q(q)]$, where $\phi$ represents a test criterion (such as the result being non-empty). Once a model is generated, the solution translation module 314 uses it to generate a concrete unit test.

As stated above, the SMT solver module 308 can be implemented using the Z3 SMT solver provided by Microsoft Corporation. For bags and sets, the QEX module 102 can rely on the built-in theory of extensional arrays in the Z3 SMT solver, similarly for tuples, Booleans, integers and reals.

In some cases, the formula $\phi[Q(q)]$ can be simplified, e.g., so that all bags are reduced to sets. This enables the SMT solver module 308 to more effectively process the formula. The following explanation sets forth two approaches to simplification: eager expansion and lazy expansion. As summarized in Section A, in eager expansion, the preprocessing module 306 expands the formula in an up front manner (for a particular candidate finite table size before it is fed to the SMT solver module 308. In lazy expansion, the preprocessing module 306 identifies query-specific axioms that allow the SMT solver module 308 to expand the formula on an as-needed basis.

B.3.1. Eager Expansion

Consider a formula $\psi[\overline{X}]$ as an instance of the model generation problem, where every X in $\overline{X}$ is a bag variable. The formula $\psi$ may include other free variables that correspond to parameter variables in the original query. For the analysis, the following inductively-defined term is introduced, called a set describer, having the sort $S(\sigma)$. A set describer has the following characteristics.

(a) The constant $\text{Empty}^{S(\sigma)}$ is a set describer.
(b) If $t^{S(\sigma)}$ is a set describer, then so is the term $\text{Set}(\phi^B, u^\sigma, t)$.

Given a state S for $\text{Set}(\phi, u, t)$, the interpretation in S is, $\text{Set}(\phi, u, t)^S = \text{Ite}(\phi, \{u\}, \emptyset)^S \cup t^S, \text{Empty}^S = \emptyset$.

Consider a fixed X in $\overline{X}$ and let $t_X$ be the set describer, $\text{Set}(\text{true}, \langle x_1, m_1 \rangle, \ldots, \text{Set}(\text{true}, \langle x_k, m_l \rangle, \text{Empty}) \ldots)$ Here, k and all the $m_j$'s are some positive integer constants and each $x_i$ is a variable. Thus, $t_X$ describes the set $\{\langle x_1, m_1 \rangle, \ldots, \langle x_k, m_k \rangle\}$. It is also assumed that there is an associated constraint $\text{distinct}(x_1, \ldots, x_k)$ stating that all the $x_i$'s are pairwise distinct. Thus, $t_X$ is a valid bag term, in any context where the constraint holds.

The expansion of $\psi[\overline{t_X}]$, $\text{Exp}(\psi[\overline{t_X}])$, eliminates comprehensions and projected sums from $\psi[\overline{t_X}]$. The definition of Exp is by induction over the structure of terms. The case of comprehensions is as follows. Here, it is assumed that the comprehension has a single bound variable, but the definition is straightforward to generalize to any number of bound variables. It is also assumed here that the comprehension has a special form, where the bound variable x is not free in r.

$$\text{Exp}(\{t \mid_x x \in r \land \phi\}) \stackrel{def}{=} \text{ExpC}(t, x, \text{Exp}(r), \phi)$$

$$\text{ExpC}(t, x, \text{Empty}, \phi) \stackrel{def}{=} \text{Empty}$$

$$\text{ExpC}(t[x], x, \text{Set}(\gamma, u, \text{rest}),$$

$$\phi[x]) \stackrel{def}{=} \text{Set}(\gamma \land \text{Exp}(\phi[u]), \text{Exp}(t[u]), \text{ExpC}(t, x, \text{rest}, \phi))$$

Not all comprehensions are expanded this way. Rather, some expressions use specialized expansion rules. For example, for Expression (10), $\text{Exp}(\text{Min}(t))$ is replaced by a fresh variable x and the formula, $$\text{Ite}(\text{Exp}(t) \neq \emptyset, (\text{IsLeq}(x, \text{Exp}(t)) \land x \in \text{Exp}(t)), x = 0).$$

This is equivalent to $x = \text{Min}(t)$, that is included as a top-level conjunct (in $\text{Exp}(\psi[\overline{t_X}])$), where, $$\text{IsLeq}(x, \text{Empty}) \stackrel{def}{=} \text{true}$$

$$\text{IsLeq}(x, \text{Set}(\phi, u, r)) \stackrel{def}{=} (\phi \Rightarrow x \leq u) \land \text{IsLeq}(x, r).$$

Note that a formula $\psi[t]$ is equivalent to the formula $\exists x(\psi[x] \land x = t)$, where x is a fresh variable. For $\Sigma_i$ the expansion is as follows:

$$\text{Exp}(\Sigma_i(t)) \stackrel{def}{=} \text{Sum}_i(\text{Exp}(t), \text{Empty})$$

$$\text{Sum}_i(\text{Empty}, s) \stackrel{def}{=} 0$$

$$\text{Sum}_i(\text{Set}(\gamma, u, \text{rest}), s) \stackrel{def}{=}$$

$$\text{Ite}(\gamma \land u \notin s, \pi_i(u), 0) + \text{Sum}_i(\text{rest}, \text{Set}(\gamma, u, s))$$

Note that the role of s is to accumulate elements that have already been included in the sum, so that the same element is not added twice.

Regarding multiplication, the general form of Expression (5), that involves a comprehension without a range expression, is not needed. Since all multiplicities in the initial tables $t_X$ are fixed constants, it follows that multiplications are either of the form $k_1 * k_2$, where $k_1$ and $k_2$ are constants (in formulas created in Expression (8)), which preserves the constant multiplicities in the resulting table, or multiplicities are finite sums of constants (as in Expression (6)), which provides constant upper and lower bounds for the multiplicities. Multiplication under these constraints is supported in Z3.

It is also possible to expand t÷u as defined in Expression (11), by replacing Exp(t÷u) with a fresh variable $x^R$ and adding the top-level conjunct Exp(u)*x=Exp(t). Here, Exp(u) is also a sum of terms that have constant upper and lower bounds.

As described above (e.g., with reference particularly to FIG. 4), the overall approach amounts to systematically enumerating the sizes of the tables and the multiplicities, and searching for a model of the resulting expanded formula.

B.3.2. Lazy Expansion

The main disadvantage of the eager approach is that it expands all terms upfront (in the preprocessing module 306), without taking into account whether a certain expansion is actually used in a particular context. An alternative (or complementary) approach is to delay the expansion of at least some terms by delegating the expansion to the SMT solver module 308. This section presents a description of such delayed or lazy expansion.

In addition to a quantifier free formula that is provided to the SMT solver module 308 and for which proof of satisfiability is sought, it is also possible to provide additional universally quantified axioms. During proof search in the SMT solver module 308, axioms are triggered by matching sub-expressions in ψ. An axiom has the form ($\forall \bar{x}(\alpha)$, $pat_\alpha$), where α is a quantifier-free formula, $pat_\alpha$ is a quantifier-free term, and FV(α)=FV($pat_\alpha$)=$\bar{x}$. Thus, in the case of lazy expansion, the preprocessing module 306 identifies the axioms that can be expanded on as-needed basis by the SMT solver module 308.

The axioms typically define properties of un-interpreted function symbols in an extended signature. The high-level view behind the use of the axioms is as follows. If ψ contains a sub-term t and there exists a substitution such that t=$pat_\alpha\theta$, i.e., t matches the pattern $pat_\alpha$, then ψ is replaced during proof search by (a reduction of) ψ∧αθ. (In general, it is possible to associate several patterns within an axiom, any one of which can be used for triggering. Further, it is possible to apply multi-patterns in the SMT solver module 308. A multi-pattern is a collection of patterns; an axiom is triggered when all the patterns are matched.) Note that, if a pattern is never matched in the above-indicated manner, the use of the corresponding axiom is not triggered. Thus, the use of axioms is inherently incomplete, and it is not guaranteed that the axioms hold in a model of ψ, if one is found. Further, it is not even guaranteed that the axioms are consistent.

The following illustrates the use of axioms with the projected sum operator. Assume that Empty, Set, and $Sum_i$ are new function symbols and assume that the following axioms apply:

$$\alpha_1 = \forall s(Sum_i(Empty,s)=0)$$

$$pat_{\alpha 1} = Sum_i(Empty,s)$$

$$\alpha_2 = \forall burs(Sum_i(Set(b,u,r),s) = Ite(b \wedge u \notin s, \pi_i(u),0) + Sum_i(r,Ite(b,\{u\},\emptyset) \cup s))$$

$$pat_{\alpha 2} = Sum_i(Set(b,u,r),s)$$

Note that, unlike how $Sum_i$ is defined in Section B.3.1, the argument s here is not a set describer, but a set valued term that has built-in interpretation in the SMT solver module 308. Consider an example reduction. Let $\psi_0$ correspond to the formula:

$$x \leq Sum_1(Set(true, \langle 1, y \rangle, Set(true, \langle 1, z \rangle, Empty)), \emptyset)$$

The right-hand side of $\psi_0$ matches $pat_{\alpha 2}$, so $\psi_0$ reduces to $\psi_1$ over several steps. $\psi_1$ is given as follows:

$$x \leq y + Sum_1(Set(true, \langle 1, z \rangle, Empty), \{\langle 1, y \rangle\})$$

The same axiom can be applied again to reduce $\psi_1$ to $\psi_2$:

$$x \leq y + Ite(z \neq y, z, 0) + Sum_1(Empty, \{\langle 1, y \rangle, \langle 1, z \rangle\})$$

Finally, $\alpha_1$ can be used to reduce $\psi_2$ to $x \leq y + Ite(z \neq y, z, 0)$.

In general, such axioms can be defined for expanding other constructs. The potential cost of performing lazy expansion is an additional overhead incurred by the axiomatization of the expansion rules and the loss of completeness. These factors can be taken into account in determining whether to perform lazy expansion in a particular application. In the examples presented here, relatively small tables are generated; in this case, either eager or lazy expansion can be performed without significant drawbacks.

FIGS. 11 and 12 provide additional examples which illustrate the encoding of the expansion rules as axioms for Z3. Namely, FIG. 11 corresponds to a function Sum, which represents a simplified version of the projected sum operation. The generated model of the formula yields res=12. FIG. 12 corresponds to a function Join, which represents a function which produces a list of pairs from a list of singleton tuples. The sample describes a simplified version of expanding a comprehension term that represents a join of two tables.

Given (tables) $l_1 = \{\langle 1 \rangle, \langle 2, \rangle, \langle 3 \rangle\}$ and $l_2 = \{\langle 5 \rangle, \langle 6 \rangle\}$, $$Join(l_1, l_2) = \{\langle 1,5 \rangle, \langle 1,6 \rangle, \langle 2,5 \rangle, \langle 2,6 \rangle, \langle 3,5 \rangle, \langle 3,6 \rangle\}$$

The examples in FIGS. 11 and 12 are written in the smt-lib format provided at Ranise, et al., "The SMT-LIB Standard: Version 1.2," Technical Report, Department of Computer Science, The University of Iowa, 2006.

B.4. Experiments

The following experiments illustrate one concrete example of the operation of the QEX module 102. Here, the QEX module 102 generates database unit tests in Visual Studio® provided by Microsoft Corporation of Redmond, Wash. The SMT solver module 308 is implemented using the Z3 SMT solver, provided by Microsoft Corporation.

Figure 7:
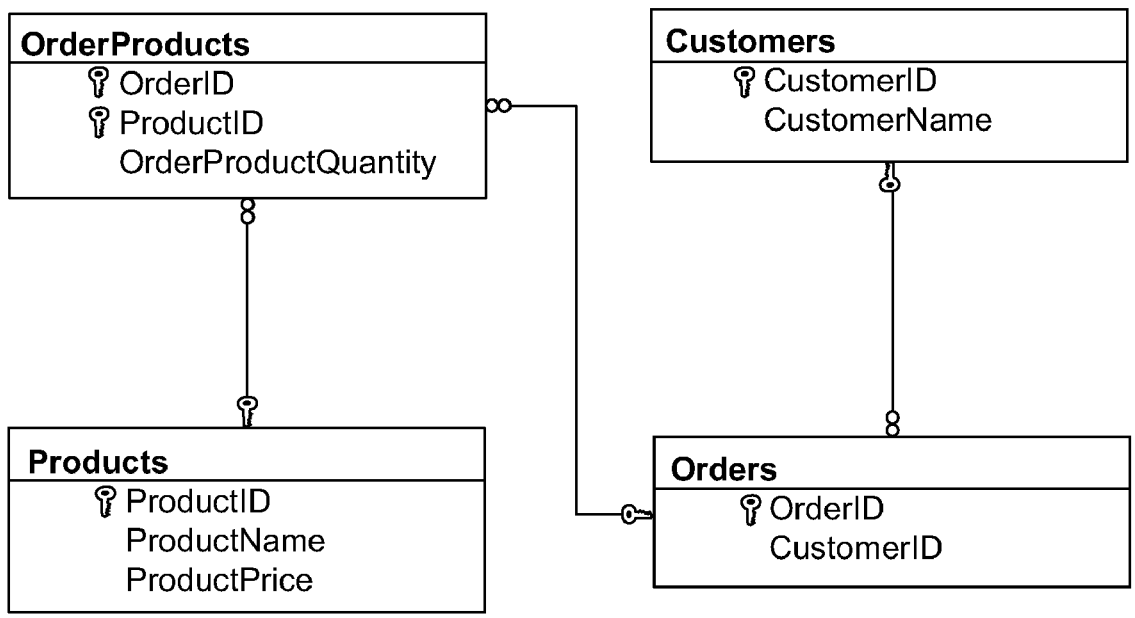
FIG. 7 shows an illustrative database that can be evaluated using the system of FIG. 1.

Consider the sample database shown in FIG. 7 for use in a hypothetical online store. This database contains tables for products, orders and customers, and a cross table (OrderProducts) between the orders and the products. Products have a product id, a name and a price. Customers have a customer id and a name. Orders have an order id and a customer id. OrderProducts have an order id, product id, and quantity amount.

FIG. 8 shows three sample queries for presentation to the database. Query q1 selects customers and related orders based on a constraint on the ids. Query q2 selects those customers, and corresponding number of orders, who have more than one order. Query q3 selects "good" customers based on a specified criterion pertaining to purchases made by the customers; this query has a parameter named "@value."

The performance of the QEX module 102 in generating models for different input table sizes and test conditions can be summarized using an expansion time metric $t_{exp}$ and a proof search time metric $t_{z3}$, which together represent the total time spent in processing a query. The expansion time $t_{exp}$ represents the amount of time spent in expanding a formula using the preprocessing module 306 (e.g., in case the eager expansion approach is used), while the proof search time $t_{z3}$ represents the amount of time spent searching for a solution in the SMT solver module 308. k represents the expected number of rows in each of the generated input tables. Improvements in evaluation time can be gained by optimizing the expansion algorithm and by using structure sharing (rather than a naive representation of terms in $T^\Sigma$).

In some environment-specific scenarios, the particular results may reveal that $t_{exp} \ll t_{z3}$, although the actual parameter and table generation takes place during proof search. Note that $t_{exp}$ is independent of the test condition, whereas $t_{z3}$ depends on it. In general, exhaustive search for models is more time-consuming when the formula is unsatisfiable, compared to the case in which a model exists.

In the above experiment, consider the query q2 for example. Assume that the test criterion is res≠∅ (meaning that the result is specified to be non-empty). The query q2 is unsatisfiable with one row in each input table (e.g., k=1) due to the condition Count(O.OrderID)>1. But the query q2 has a solution for k=2, 3, etc. Both the expansion of the query and the search for a solution can be performed very quickly, e.g., often in a fraction of a second.

The QEX module 102 can convey its output information in any format, such as the user interface (UI) presentation 900 shown in FIG. 9. The UI presentation 900 includes a result summary section 902 that provides information regarding the tables and parameters generated by the QEX module 102. The UI presentation 900 includes a "Go To" button 904 or the like; by activating this button 904, the QEX module 102 instructs the query evaluation module 104 to perform a unit test based on the output information provided in the result summary section 902. That is, when instructed, the query evaluation module 104 populates an actual database with the table information. The query evaluation module 104 then instantiates a query with the determined parameter value(s), and submits the query to the populated database to produce an evaluation result. (Alternatively, the "Go To" button 904 can be used to display the automatically-generated code and/or data that will implement the unit test.) Finally, the query evaluation module 104 compares the evaluation result against the expected results. Namely, the query evaluation module 104 determines whether the evaluation result produces the identified test criterion (specified by the condition information) and/or the predicted result.

C. Representative Processing Functionality

FIG. 10 sets forth illustrative electrical data processing functionality 1000 that can be used to implement any aspect of the functions described above. With reference to FIG. 1, for instance, the type of processing functionality 1000 shown in FIG. 10 can be used to implement any aspect of the QEX module 102 and/or the query evaluation module 104. In one case, the processing functionality 1000 may correspond to any type of computing device that includes one or more processing devices.

The processing functionality 1000 can include volatile and non-volatile memory, such as RAM 1002 and ROM 1004, as well as one or more processing devices 1006. The processing functionality 1000 also optionally includes various media devices 1008, such as a hard disk module, an optical disk module, and so forth. The processing functionality 1000 can perform various operations identified above when the processing device(s) 1006 executes instructions that are maintained by memory (e.g., RAM 1002, ROM 1004, or elsewhere). More generally, instructions and other information can be stored on any computer readable medium 1010, including, but not limited to, static memory storage devices, magnetic storage devices, optical storage devices, and so on. The term computer readable medium also encompasses plural storage devices. The term computer readable medium also encompasses signals transmitted from a first location to a second location, e.g., via wire, cable, wireless transmission, etc.

The processing functionality 1000 also includes an input/output module 1012 for receiving various inputs from a user (via input modules 1014), and for providing various outputs to the user (via output modules). One particular output mechanism may include a presentation module 1016 and an associated graphical user interface (GUI) 1018. The processing functionality 1000 can also include one or more network interfaces 1020 for exchanging data with other devices via one or more communication conduits 1022. One or more communication buses 1024 communicatively couple the above-described components together.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for evaluating a database, the method implemented by a computing device and comprising:
   receiving input information, the input information including:
      query information that describes a query for presenting to the database;
      condition information that describes a condition, wherein submitting the query to the database is desired to meet the condition; and
      database information that describes at least one characteristic of the database;
   generating output information based on the input information using a satisfiability modulo theories (SMT) approach, the output information including:
      table information that provides one or more tables for populating the database;
      parameter information that provides one or more parameter values to instantiate the query in an instance when the query includes one or more parameter variables; and
      result information that provides a predicted result that is predicted to occur upon submission of the query to the database;
   populating the database with the table information to provide a populated database;
   instantiating the query with the parameter information to provide an instantiated query;
   submitting the instantiated query to the populated database and receiving an evaluation result; and
   comparing the evaluation result with the condition information to provide an evaluation assessment,
   wherein the table information and the query information are provided such that, when the instantiated query is submitted to the populated database, the evaluation result agrees with the condition information;
   wherein said generating comprises:
   translating the query into a formula based on a background theory, wherein the formula is expressed within the background theory;
   preprocessing the formula to render the formula in a form suitable for processing by a SMT solver module; and
   processing the formula, after said preprocessing, using the SMT solver module to generate a model using the SMT approach.

2. The method of claim 1, wherein the query corresponds to an SQL query.

3. The method of claim 1, wherein the method is employed to perform a unit test of the database.

4. The method of claim 1, wherein the method is employed to provide an integrity check of the database.

5. The method of claim 1, wherein the method is employed to provide a security-related check of the database.

6. The method of claim 1, wherein the background theory encodes one or more of: arithmetic, Booleans, tuples, sets, and algebraic data types.

7. The method of claim 1, wherein said preprocessing uses an eager expansion approach to expand the formula before submitting the formula to the SMT solver module.

8. The method of claim 1, wherein said preprocessing uses a lazy expansion approach to provide axioms to the SMT solver module, the axioms allowing the SMT solver module to expand the formula on an as-needed basis.

9. The method of claim 1, wherein said processing of the formula by the SMT solver module comprises iteratively searching for the model using progressively-increasing candidate table sizes.

10. The method of claim 1, further comprising translating the model provided by the SMT solver module using at least one domain-specific rule to provide the output information.

11. One or more storage devices storing computer readable instructions which, when executed by the one or more processing devices, cause the one or more processing devices to perform the method of claim 1.

12. A method for providing symbolic query exploration using one or more processing devices, the method comprising:
    receiving input information, the input information including query information that describes a query for presenting to a database;
    translating the query into a formula based on a background theory, wherein the formula is expressed within the background theory; and
    preprocessing the formula to render the formula in a form suitable for processing by satisfiability modulo theories (SMT) solver logic,
    wherein the preprocessing includes using an eager expansion approach to expand the formula before submitting the formula to the SMT solver logic,
    wherein at least one of the translating or the preprocessing is performed by the one or more processing devices.

13. The method of claim 12, wherein the query corresponds to an SQL query.

14. The method of claim 12, wherein the background theory encodes one or more of: arithmetic, Booleans, tuples, sets, and algebraic data types.

15. One or more storage devices storing computer readable instructions which, when executed by the one or more processing devices, cause the one or more processing devices to perform the method of claim 12.

16. A method for providing symbolic query exploration using one or more processing devices, the method comprising:
    receiving input information, the input information including query information that describes a query for presenting to a database;
    translating the query into a formula based on a background theory, wherein the formula is expressed within the background theory; and
    preprocessing the formula to render the formula in a form suitable for processing by satisfiability modulo theories (SMT) solver logic,
    wherein the preprocessing includes lazy expansion that provides axioms to the SMT solver logic, the axioms allowing the SMT solver logic to expand the formula on an as-needed basis,
    wherein at least one of the translating or the preprocessing is performed by the one or more processing devices.

17. One or more storage devices storing computer readable instructions which, when executed by the one or more processing devices, cause the one or more processing devices to perform the method of claim 16.

18. A method for providing symbolic query exploration using one or more processing devices, the method comprising:
    receiving input information, the input information including query information that describes a query for presenting to a database;
    translating the query into a formula based on a background theory, wherein the formula is expressed within the background theory;
    preprocessing the formula to render the formula in a form suitable for processing by satisfiability modulo theories (SMT) solver logic,
    receiving a model from the SMT solver logic that reflects a solution to the formula; and
    translating the model using at least one domain-specific rule to provide output information,
    wherein at least one of the translating the query, the preprocessing, or the translating the model is performed by the one or more processing devices.

19. One or more storage devices storing computer readable instructions which, when executed by the one or more processing devices, cause the one or more processing devices to perform the method of claim 18.

20. A system comprising:
    a symbolic query exploration module comprising:
        a query translation module configured to translate a query into a formula based on a background theory, wherein the formula is expressed within the background theory,
        wherein the symbolic query exploration module is configured to submit the query to a satisfiability modulo theories (SMT) solver module and receive a model from the SMT solver module in response, the model specifying table information and parameter information, wherein the table information and the parameter information are such that, when the query is instantiated with the parameter information and is submitted to a database that is populated with the table information, an evaluation result is produced which agrees with pre-specified condition information; and
    at least one processing device configured to execute the symbolic query exploration module,
    wherein the symbolic query exploration module is configured to control the SMT solver module to iteratively search for the model using progressively-increasing candidate table sizes.

* * * * *